INVENTORS
JOHN E. HAM
BY GARTH F. NICOLSON

ATTORNEY

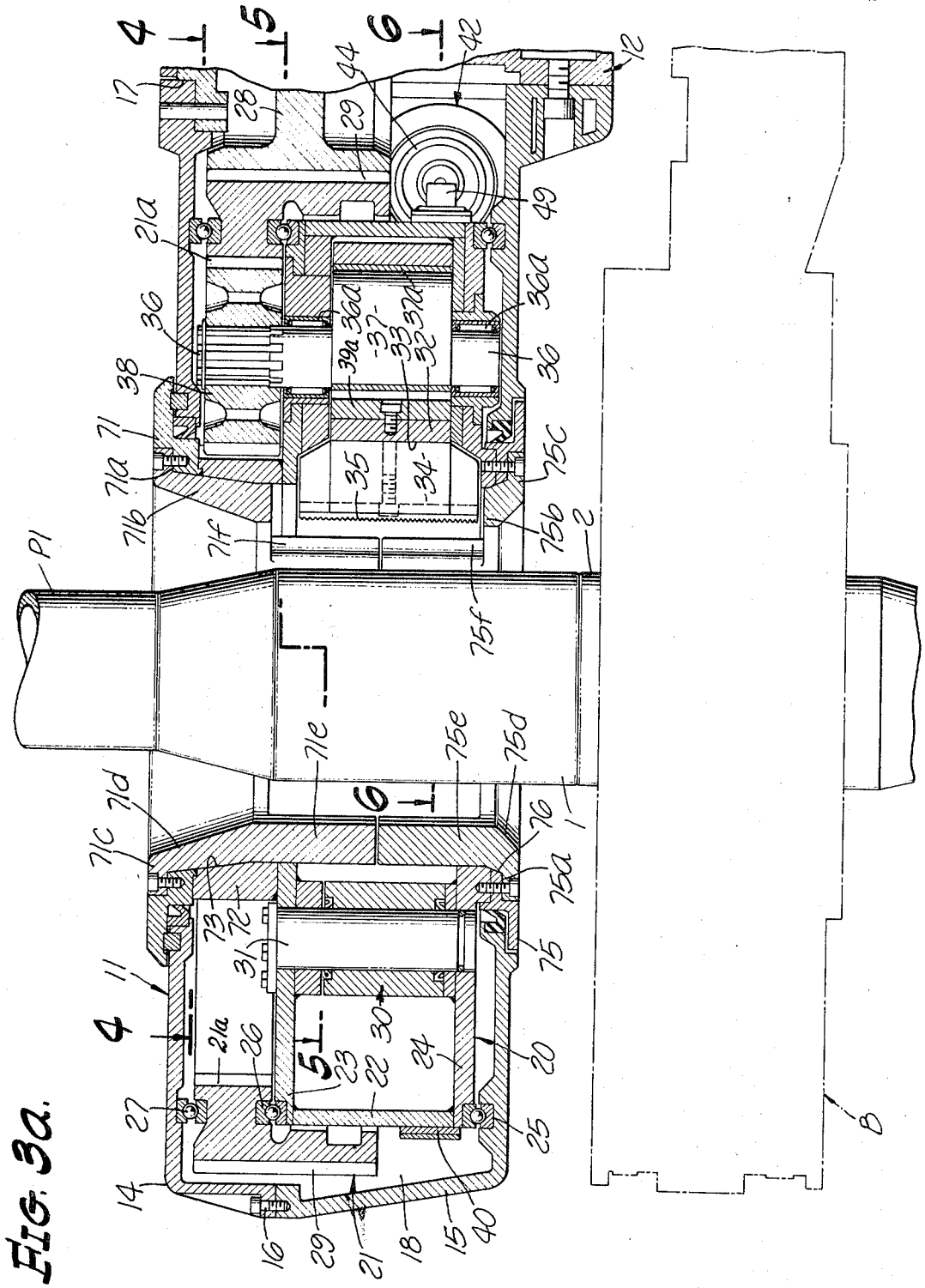

INVENTORS.
JOHN E. HAM
BY GARTH F. NICOLSON
ATTORNEY

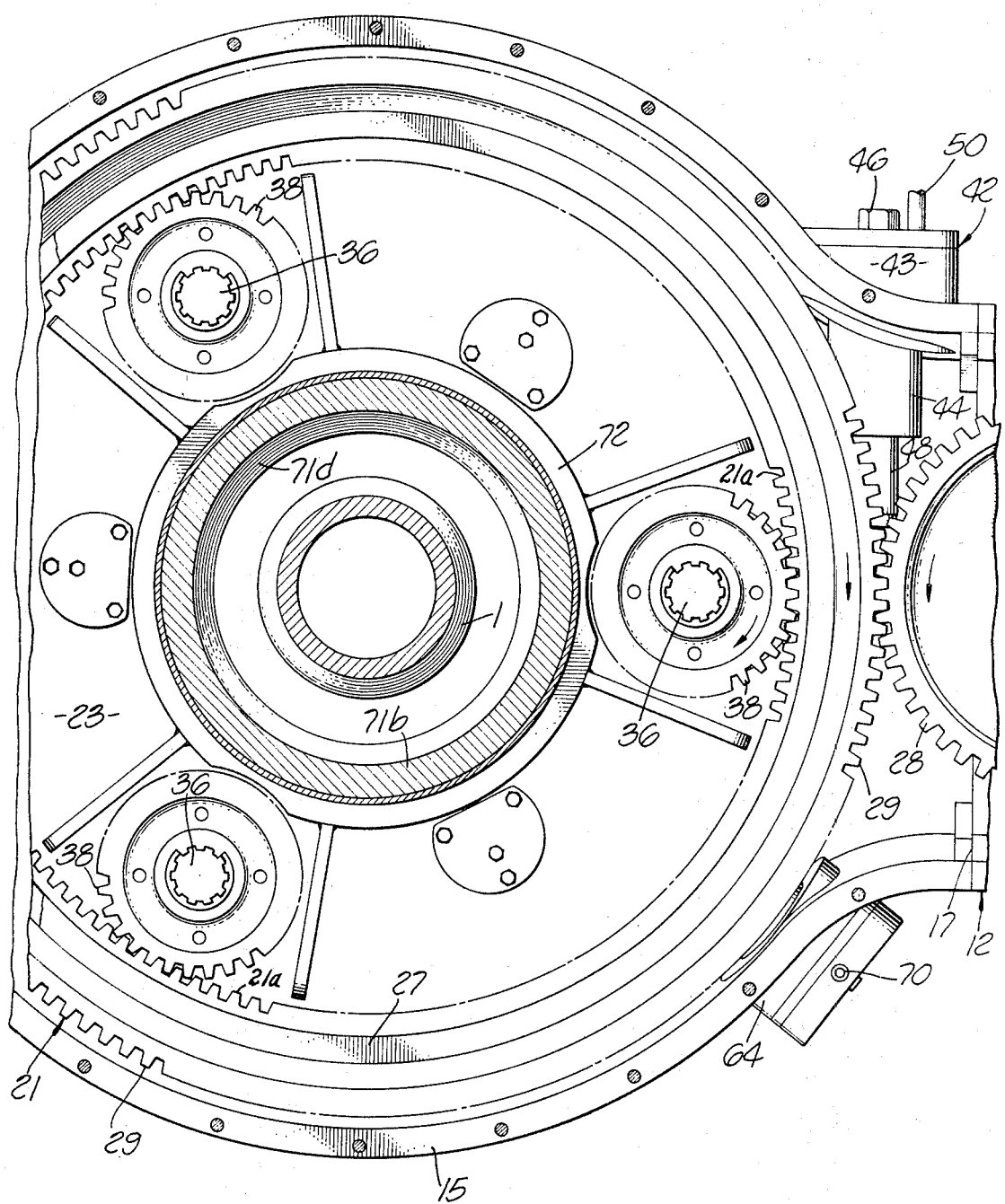

INVENTORS.
JOHN E. HAM
GARTH F. NICOLSON
BY

ATTORNEY

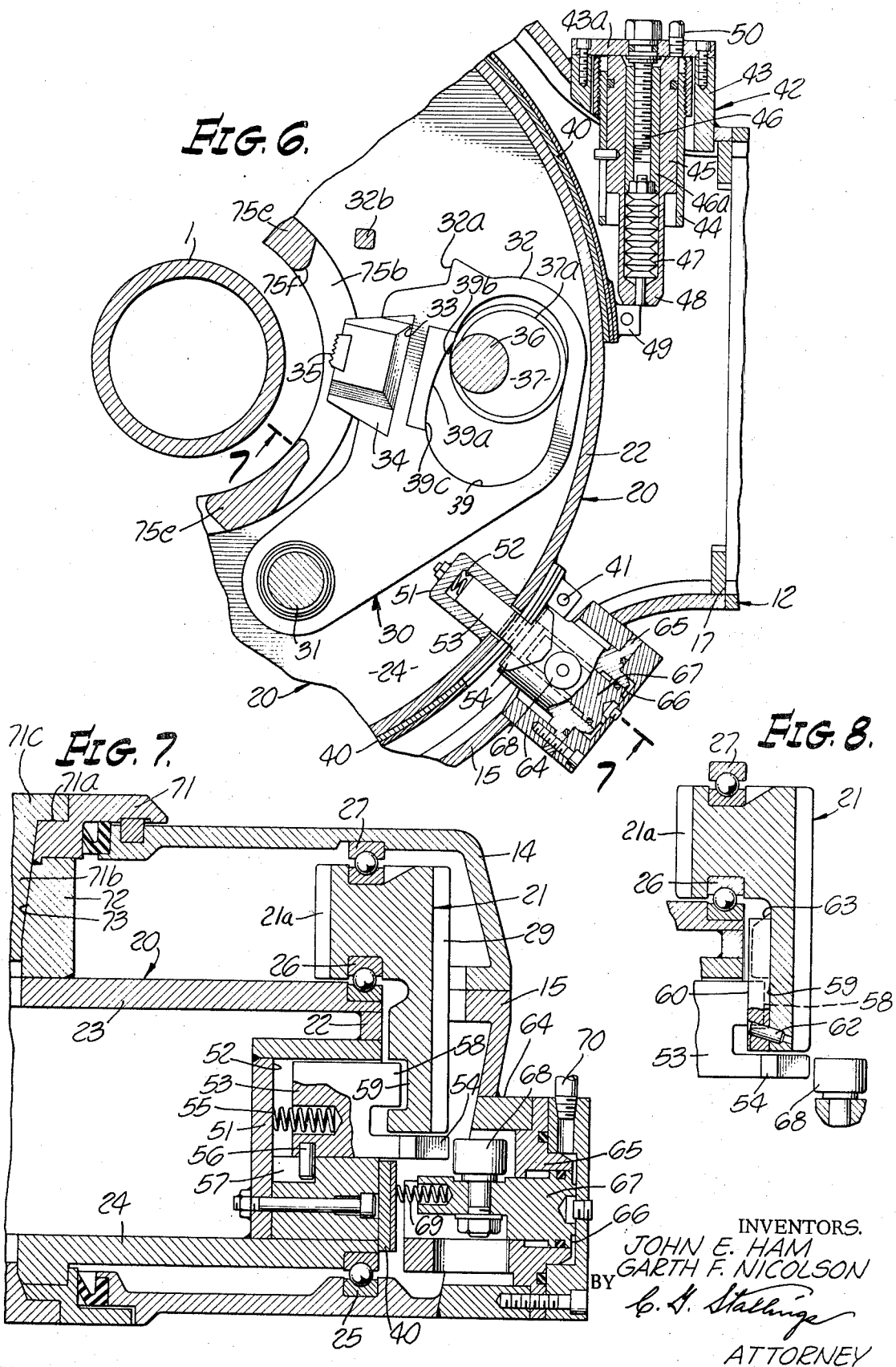

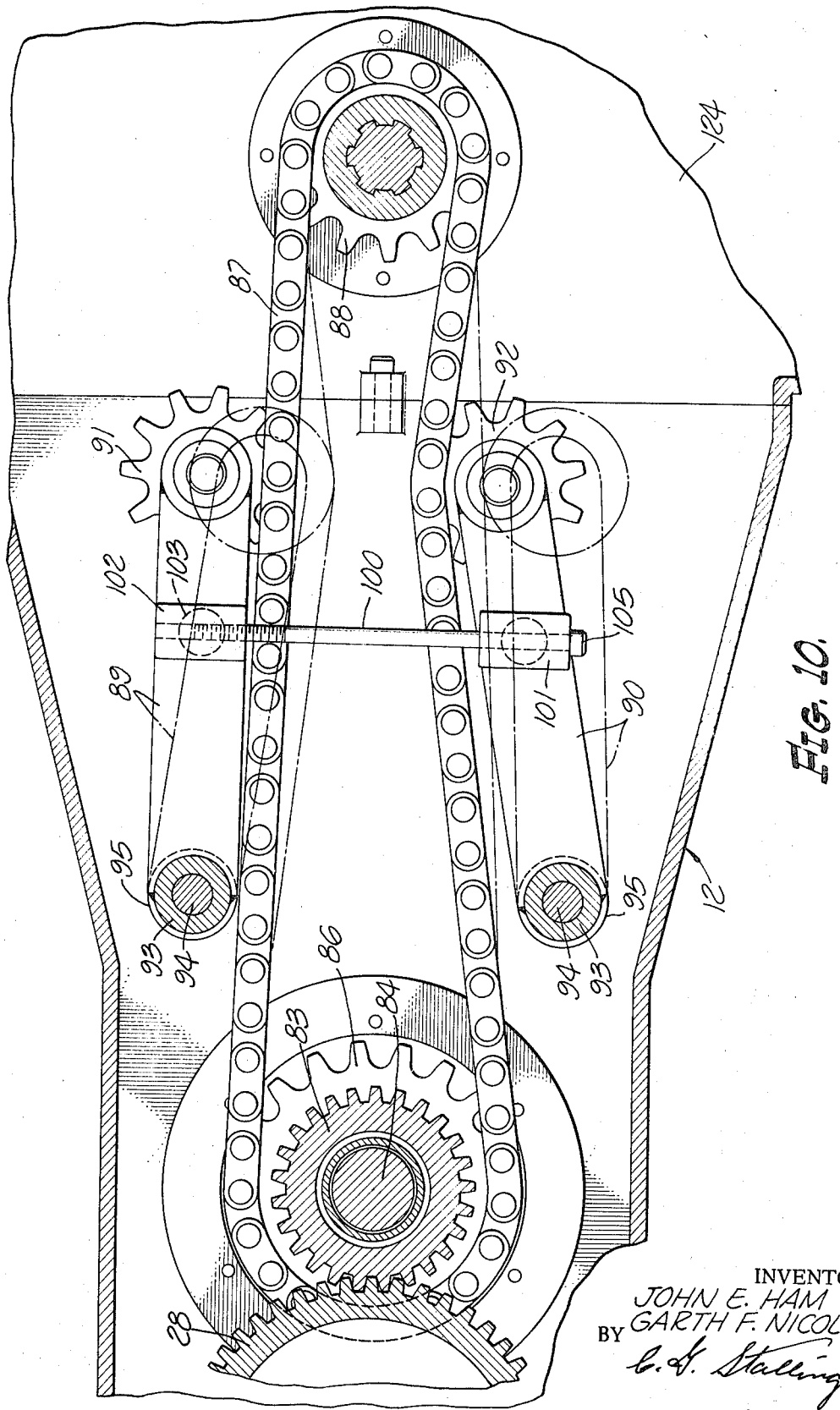

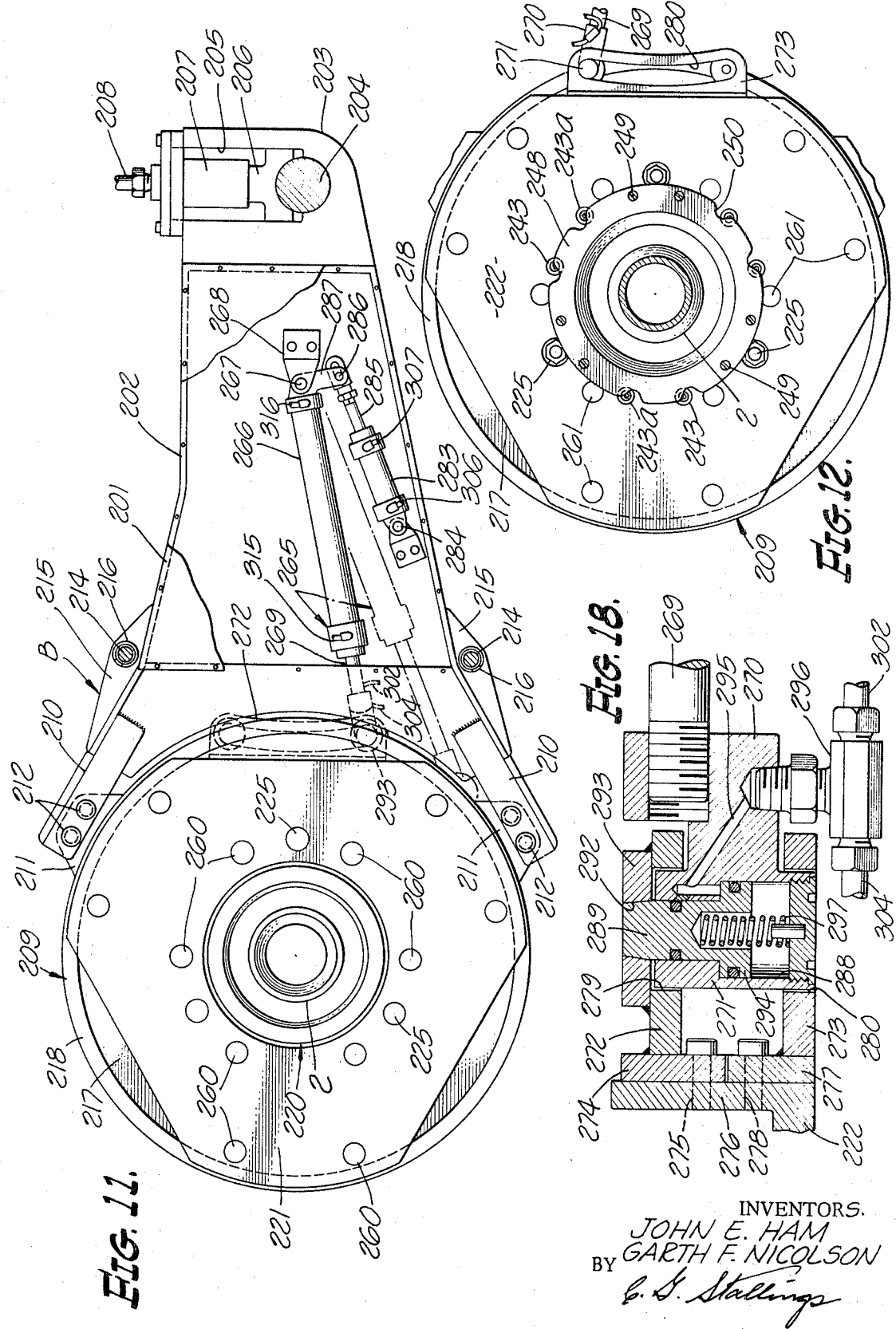

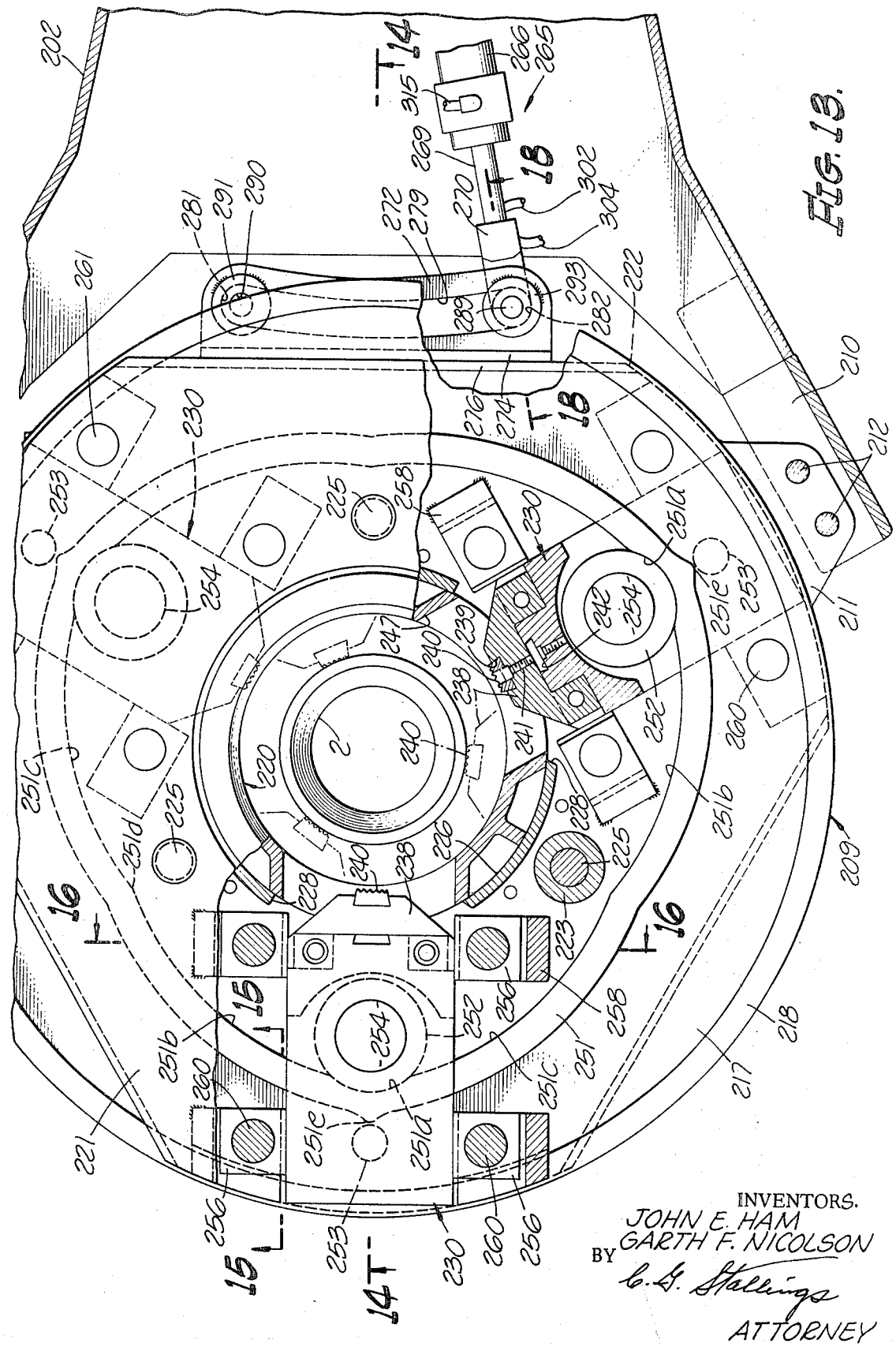

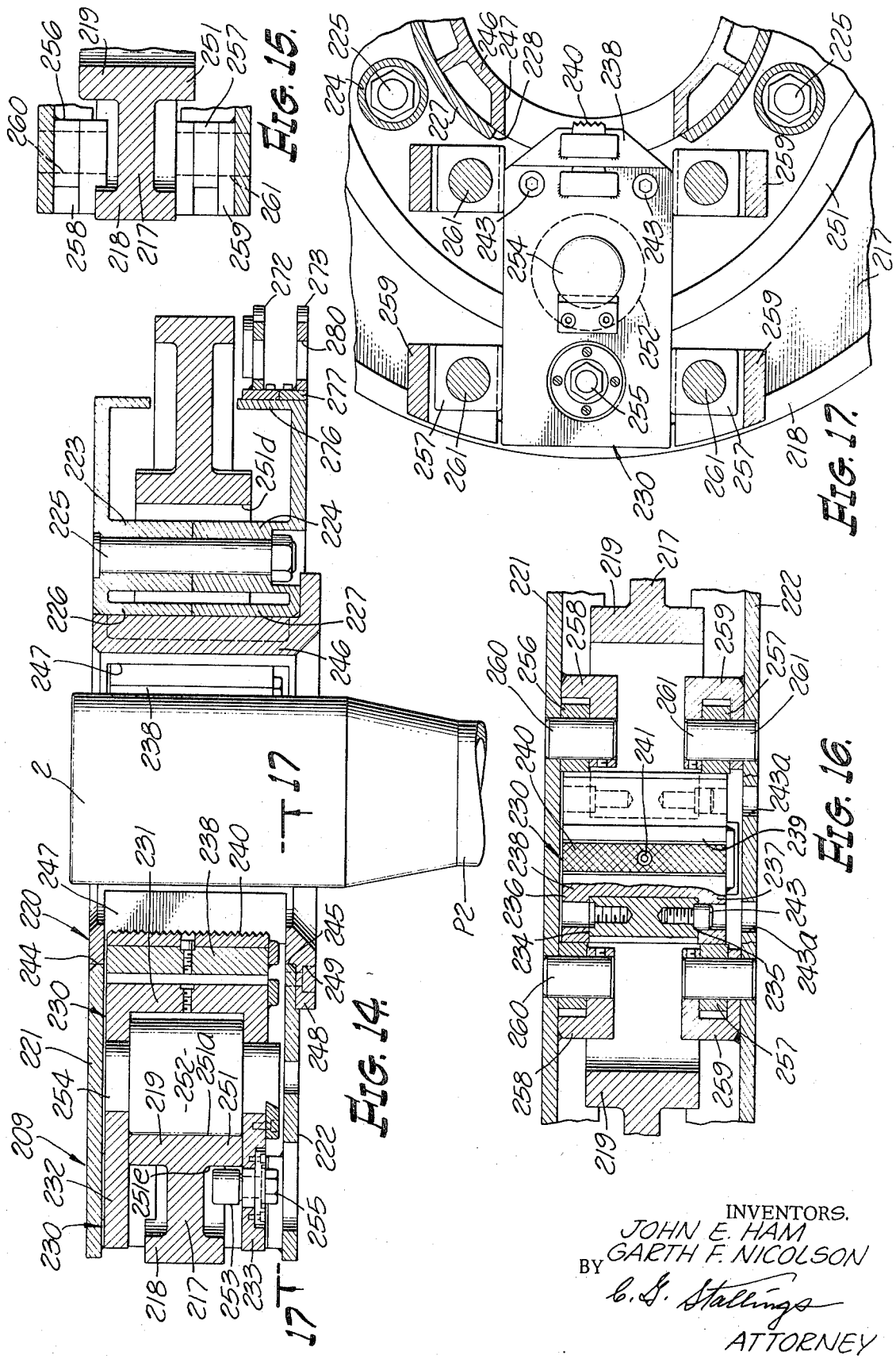

INVENTORS.
JOHN E. HAM
GARTH F. NICOLSON
ATTORNEY

United States Patent Office 3,518,903
Patented July 7, 1970

3,518,903
COMBINED POWER TONG AND BACKUP TONG ASSEMBLY
John E. Ham, Long Beach, and Garth F. Nicolson, Huntington Beach, Calif., assignors to Byron Jackson Inc., Long Beach, Calif., a corporation of Delaware
Filed Dec. 26, 1967, Ser. No. 693,374
Int. Cl. B25b *17/00*
U.S. Cl. 81—57.16                                  18 Claims

ABSTRACT OF THE DISCLOSURE

A combined power well pipe tong and backup tong assembly in which the backup tong is actuated into gripping engagement with one pipe joint when the power tong is driving the other pipe joint in either direction at low speed and high torque, the backup tong being released from said one pipe joint when the power tong is driving said other pipe joint at high speed and low torque, but the backup tong being optionally engageable with said one pipe joint when the power tong is driving the other pipe joint at high speed and optionally disengageable when the power tong is driving the other pipe joint at low speed.

BACKGROUND OF THE INVENTION

The present invention relates to pipe tongs adapted for use in making up and breaking out joints in well pipe, such as drill pipe or casing, and more particularly to the combination of a power tong assembly with a backup tong assembly in which the power tong assembly is operable to effect rotation in either direction of one pipe joint part relative to another pipe joint part but held stationary by the backup tong assembly at least during certain make up and break out operations performed on the joint composed of said joint parts.

In the making up of joints in a length of well pipe, such as drill pipe or the like, as well as in the breaking out of such joints, it is customary that the joint part at the upper end of the length of pipe extending into the well bore be sometimes held stationary in what is known as a "back-up tong" while the pipe joint on the length of pipe suspended in the derrick is engaged by a tong or other device adapted to effect rotary movement of the suspended length of pipe. So-called "power tongs" have heretofore been provided for rotating the suspended length of pipe in either direction. In the making up of such pipe joints it is the practice to initially spin the suspended length of pipe to effect initial threaded coengagement of the joint parts until the joint parts are "shouldered," and, thereafter, high torque forces are applied to the suspended length of pipe to finally make up the joint in a tight condition. In the breaking out of such pipe joints, high torque forces are applied to the suspended length of pipe to initially break out the pipe joint, and, thereafter, the suspended length of pipe is rapidly rotated or spun out to finally disengage the threaded joint parts. At least during the high torque phases of making up and breaking out pipe joints it is desirable and sometimes necessary that the length of pipe extended into the well bore be held against rotation in the backup tong, but, during the spinning phases of making up and breaking out such joint parts, when the torque is low, it is frequently unnecessary and undesirable that the backup tong be engaged with the length of pipe disposed in the well bore.

Particularly, it may be undesirable to spin the suspended length of pipe while the length of pipe in the well bore is engaged by the backup tong when the spinning device is a power tong connected to the backup tong as a combined assembly, inasmuch as axial displacement between the joint parts occurs during the spinning operation, which axial displacement imposes a spreading force between the spinning tong pipe gripping mechanism and the backup tong pipe gripping mechanism, on the one hand, or an opposite axial force, on the other hand.

SUMMARY

Accordingly, an object of the present invention is to provide a combined power tong and backup tong assembly adapted to be supported in an operative position over a well bore so as to make up and break out joints in a length of pipe extending through the tong assembly.

Another object of the invention is to provide a power tong and backup tong assembly in which the pipe gripping and rotating means of the power tong are operable in two modes, namely, at high speed and low torque for spinning a suspended length of pipe in either direction so as to spin up or spin out the pipe joints, or as low speed and high torque in either direction so as to finally make up or finally break out the pipe joints; while the backup tong assembly is provided with pipe gripping means adapted to be engaged with the pipe disposed in the well bore to hold the same against rotation, at least during the low speed, high torque mode of operation of the power tong.

Still another object of the invention is to provide a combined power tong and backup tong assembly in which the backup tong is actuated into gripping engagement with the pipe disposed in the well bore when the power tong is driving the other pipe suspended in the derrick in either direction at low speed and high torque, the backup tong being released from said length of pipe in the well bore when the power tong is driving the other pipe at relatively high speed and low torque.

Yet another object of the invention is to provide a combined power tong and backup tong assembly in accordance with the next preceding object in which the backup tong is optionally engageable with the pipe disposed in the well bore when the power tong is driving the suspended length of pipe at high speed and low torque.

Still another object of the invention is to provide a combined power tong and backup tong assembly in accordance with the foregoing objectives in which the backup tong is optionally disengageable with the length of pipe disposed in the well bore when the power tong is driving the suspended length of pipe at high speed and low torque.

Other objects and advantages of the invention will be hereinafter described or will become apparent to those skilled in the art and the novel features of the invention will be defined in the appended claims.

BRIEF DESCRIPTION OF THE DRAWINGS

FIG. 3a is a view in vertical section, as taken through the power tong head of the assembly along the line 3—3 of FIG. 1;

FIG. 3b is a rearward extension of FIG. 3a, showing the intermediate power transmission section of the power tong;

FIG. 4 is a view in horizontal section, as taken on the line 4—4 of FIG. 3a;

FIG. 5 is a view in horizontal section, as taken on the line 5—5 of FIG. 3a;

FIG. 6 is a view in horizontal section, as taken on the line 6—6 of FIG. 3a;

FIG. 7 is a fragmentary view in vertical section, as taken on the line 7—7 of FIG. 6;

FIG. 8 is a fragmentary view in vertical section, as taken on the line 8—8 of FIG. 5;

FIG. 10 is a horizontal sectional view, as taken on the line 10—10 of FIG. 3b;

FIG. 11 is a top plan view illustrating the backup tong of FIGS. 1 and 2, as taken on the line 11—11 of FIG. 2;

FIG. 12 is a bottom plan view showing the backup tong head;

FIG. 13 is an enlarged view, partly in top plan, with parts broken away, showing the pipe gripping mechanism of the backup tong;

FIG. 14 is a vertical sectional view, as taken on the line 14—14 of FIG. 13;

FIG. 15 is a vertical sectional view, as taken on the line 15—15 of FIG. 13;

FIG. 16 is a vertical sectional view, as taken on the line 16—16 of FIG. 13;

FIG. 17 is a fragmentary view in horizontal section, as taken on the line 17—17 of FIG. 14;

FIG. 18 is a fragmentary vertical sectional view, as taken on the line 18—18 of FIG. 13 and showing on an enlarged scale the releasable latch mechanism connecting the backup tong actuator to the pipe gripping means thereof.

DESCRIPTION OF THE PREFERRED EMBODIMENT

Figure 1:
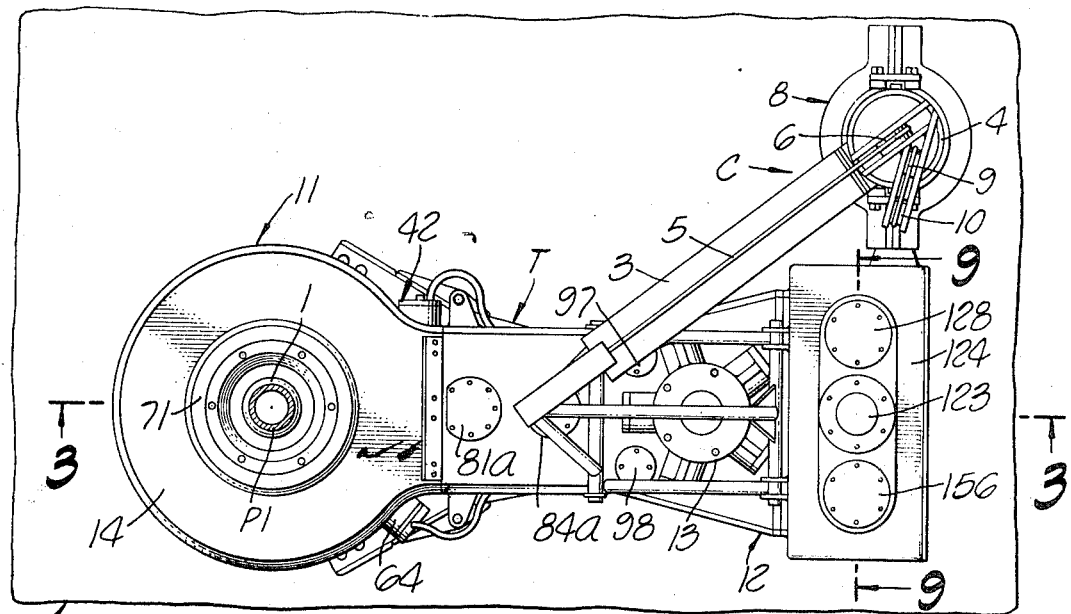
FIG. 1 is a top plan view illustrating a combined power tong and backup tong assembly made in accordance with the invention and supported in an operative position above a well bore.
Figure 2:
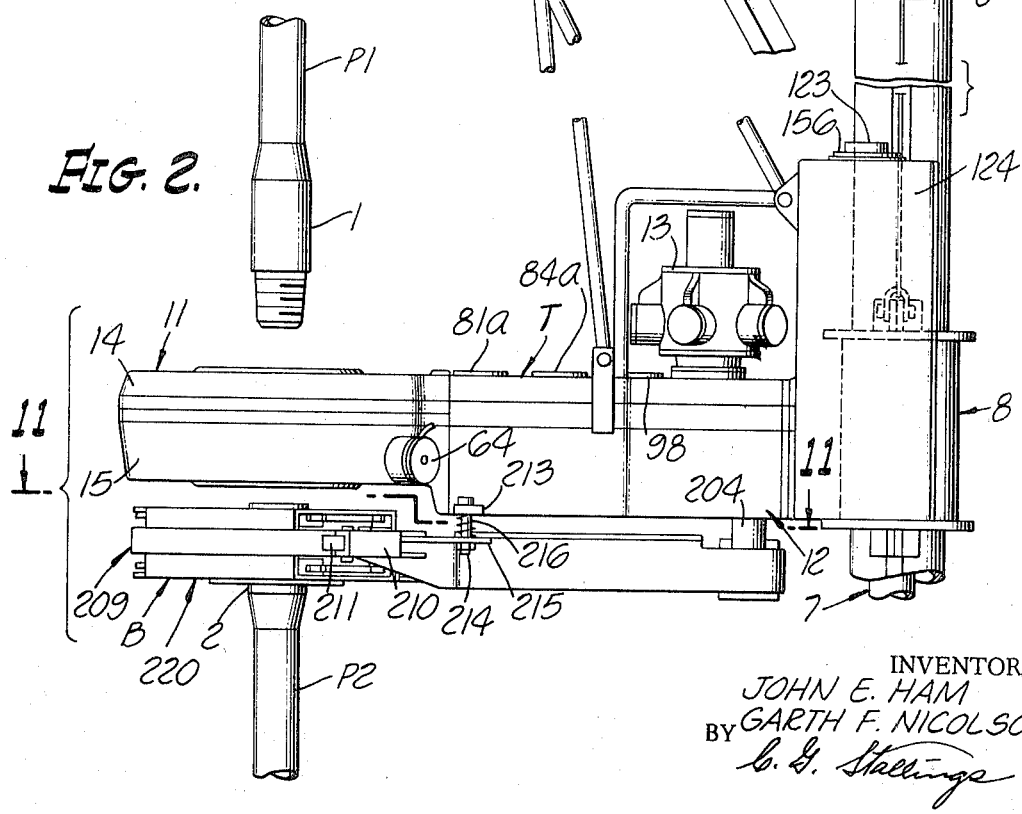
FIG. 2 is a view in side elevation of the structure of FIG. 1.
Figure 36:
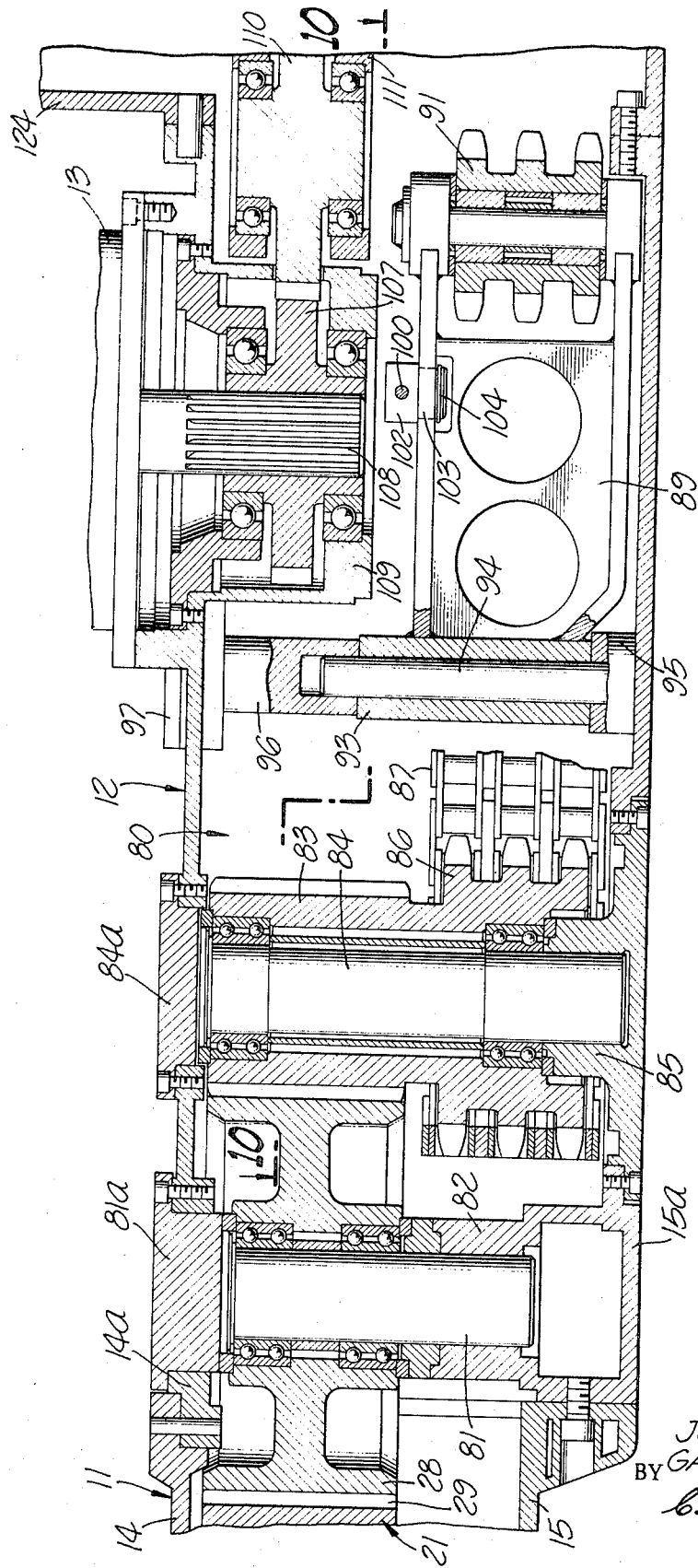

Referring first to FIGS. 1 and 2, there is generally illustrated a power tong T adapted to be supported above the floor F of a drilling platform which may be part of the usual drilling rig mounted above a well bore and into which pipe, such as drill pipe or casing, is adapted to be run and from which such pipe will be sometimes pulled, as in the case of drill pipe. Such a pipe is illustrated in FIGS. 1 and 2 as including an upper stand of pipe P1 in the illustrative form of a stand of drill pipe having a tool joint pin end 1 thereon adapted to be threadedly connected by the power tong T to the box end 2 of a length or stand of the pipe P2 disposed in the well bore. In order to support the power tong T in an operative position above the well bore so that the stand of pipe P1 may be lowered therethrough for engagement with the pipe P2, a suitable crane C is provided, including a boom 3 projecting from a vertically extended post 4. A cable 5 extends over sheaves 6, 6 and is connected to a pressure operated cylinder mechanism 7 disposed within the post 4, whereby the power tong T may be raised and lowered relative to the post 4 and thereby relative to the well bore into which or from which pipe is being removed. Also forming a part of the crane C is a slide 8 slidable vertically along the post 4, there being a second cable 9 also connected to the upper end of cylinder 7, extending over a sheave 10, and connected also to the slide 8 so that the mass of the tong assembly may be properly supported. This crane assembly C is preferably made in accordance with the disclosure in the application for Letters Patent of the United States filed Dec. 4, 1967, and entitled Power Tong Crane, Ser. No. 687,812.

The power tong, as is typical of tongs of the type here involved, includes a head section generally denoted at 11 and a supporting and power transmission section generally denoted at 12. The latter section in the illustrative embodiment has a hydraulic motor 13 adapted to be connected to a suitable source of motive fluid under pressure so as to drive the transmission mechanism of the tong assembly.

The tong head, as will hereinafter be described, is adapted to grip and effect rotation of the pin end 1 of the pipe P1, while the box end 2 of the pipe P2 is held non-rotatively in a backup tong generally denoted at B. This backup tong is preferably made in accordance with the disclosure in the application for Letters Patent of the United States filed Dec. 4, 1967 and entitled Backup Tong for Power Pipe Tongs, Ser. No. 687,810.

The tong head assembly 11 is preferably constructed in accordance with the disclosure in the application for Letters Patent of the United States filed Dec. 4, 1967, and entitled Pipe Tong Head, Ser. No. 687,830.

Referring now more particularly to FIGS. 3a–8, the tong head assembly will be seen to comprise a frame structure including a horizontally split case having an upper case section 14 and a lower case section 15 joined as by fasteners 16 and connected at 17 to power transmission section 12 of the tong assembly. The case provides an internal annular space 18 in which is revolvably disposed what, as will hereinafter appear, may be characterized as a pipe engaging and rotating head including an inner ring assembly 20 and an outer ring assembly 21 which are supported one relative to the other for relative rotation of the rings as well as for rotation of the rings as a unit within the tong case.

The inner ring 20 comprises a box-like structure comprising an outer annular wall 22, an upper wall 23 and a bottom wall 24. Supporting the inner ring for rotation within the case is an annular bearing 25 and, at the upper side of the inner ring is an annular bearing 26 on which is revolvably disposed the outer ring 21, an additional annular bearing 27 being provided between the upper case section 14 and the outer ring 21. The outer ring 21 is adapted to be driven by a gear 28 which constitutes the driven gear of the transmission mechanism powered by the motor 13, hereinafter to be more fully described, to rotatively drive the gear 28. This gear 28 constitutes means for driving rotatively the outer ring 21 and, therefore, the latter is provided with teeth 29 in mesh with the teeth of gear 28. The inner ring 20 is provided with pipe gripping means operable in response to rotation of the outer ring 21 relative to the inner ring 20, such pipe gripping means being best illustrated in FIGS. 3a, 4 and 5.

In the illustrative structure now being described, the pipe gripping means include a plurality of circumferentially spaced jaws 30 in the form of levers pivotally supported on vertical pins or shafts 31 which are, as seen in FIG. 3a, supported between the inner ring top and bottom walls. Jaw 30 has an enlarged end section 32 provided with a dovetailed slot 33 adapted to receive a pipe gripping die carrier 34, in which may be removably disposed a typical tong die 35 adapted to grip the pipe or tool joint 1, previously referred to, upon pivotal movement of the jaws 30 toward one another about their respective pivot pins 31. The die carriers 34 may range in size, that is in thickness between the base of the slot 33 and the gripping jaws of the die 35, so that the assembly is adapted to effectively grip pipe over a wide range of sizes, from relatively small drill pipe tool joints to much larger casing.

Means are provided for effecting inward movement of the jaws 30 as well as outward movement of the jaws in response to rotation of the outer ring 21 relative to the inner ring 20. In the present embodiment, such means is so constructed as to require substantially a minimum outside diameter in the tong head assembly, so as to substantially minimize the gross weight of the tong head, so as to facilitate utility of the tong assembly on drilling rigs having space limitations, and so as to facilitate the manipulation of the tong assembly during its use. Such manipulation of the tong assembly in a typical installation would involve the periodic raising and lowering of the tong assembly by the crane C between a lower position, not shown, at which the tool joint 2 of FIG. 2 would extend upwardly through the tong assembly so as to be engaged by an elevator, on the one hand, and an upper position at which the tool joint 2 of the pipe P2 will be engaged by the back-up tong B and held stationary, if desired, as the tong head 11 is operated to make up a pipe joint comprising the tool joints 1 and 2. Thus it will be apparent that the tong assembly will be shifted between these two positions many times during the running of a string of drill pipe, which may be thousands of feet long, composed of short stands of the pipe. Moreover, inasmuch as the supporting mechanism, including the crane which supports the tong assembly in operative position, must be at all times out of the way when the elevator is moving pipe into and out of the hole, it will be recognized that the tong head should preferably be as light as possible, offering no more than the necessary weight hanging over the hole and requiring constant manipulation.

Accordingly, the jaw actuating mechanism comprises, for each jaw, a shaft 36 journalled in the upper and lower walls 23 and 24 of the inner ring 20 and having thereon an eccentric 37 disposed in an elongated slot 39 in the respective jaws 30. If desired, the slot 39 may be provided with a wear pad 39a engageable by the eccentric 37. It will be appreciated upon reference to FIGS. 5 and 6 more particularly, in which the jaws 30 are shown in retracted positions, that rotation of the shafts 36, and therefore the eccentrics 37, in either direction will cause inward pivotal movement of the jaws 30 toward the pipe or joint located within the tong head. Means are provided for effecting such pivotal movement including, as best seen in FIGS. 3a and 4, gears 38 splined or otherwise connected to each of the shafts 36 and in mesh with internal teeth 21a provided in the outer ring 21. It will now be apparent that rotation of the outer ring 21 will effect simultaneous rotation of each of the gears 38 with resultant rotation of the eccentric supporting shafts 36, provided that a drag be applied to the inner ring assembly so that the inner ring will not initially rotate along with the outer ring 21.

Figure 5:
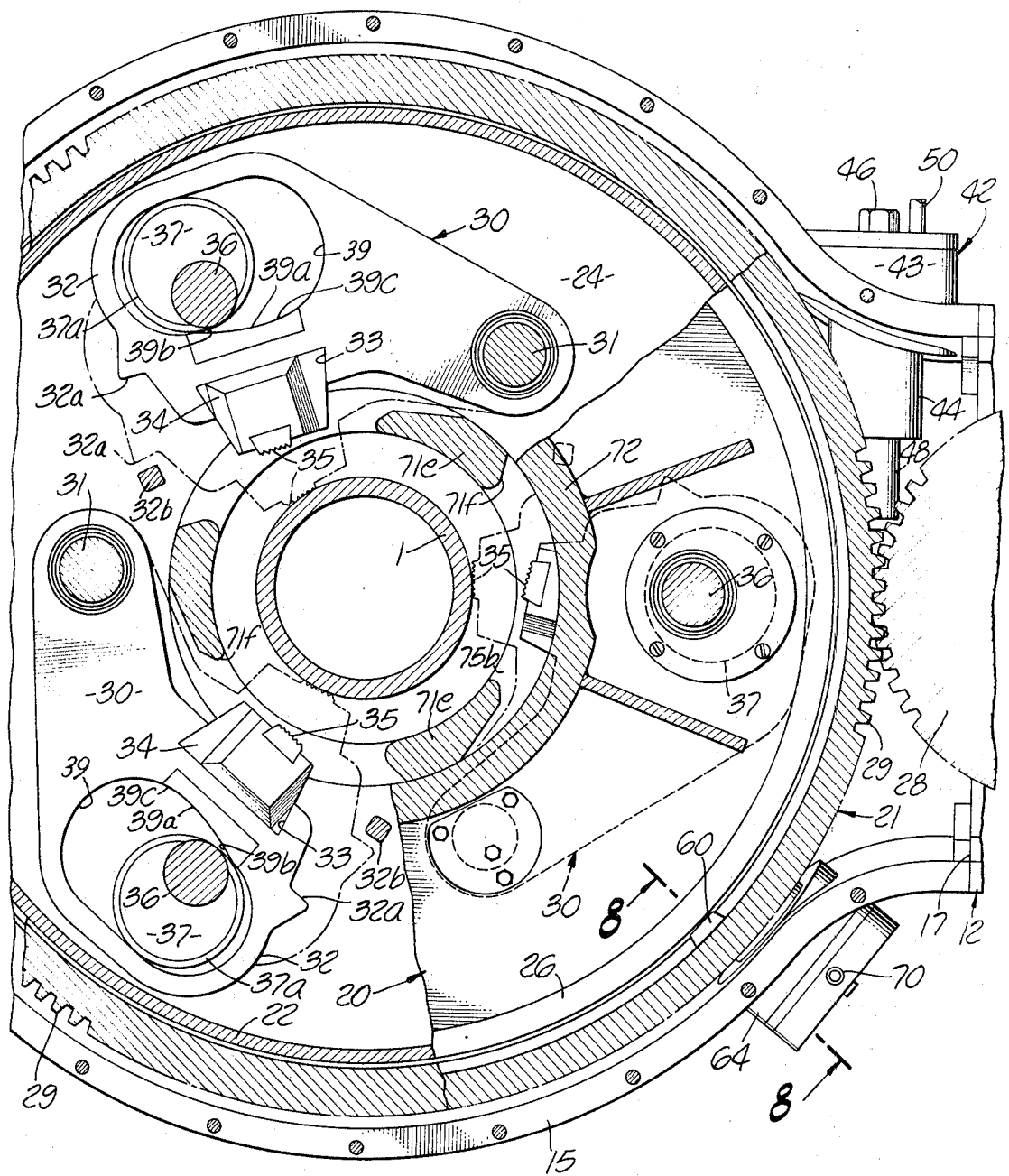

As shown in FIGS. 3a, 5, and 6, means are provided whereby to minimize frictional resistance to the forceable pivotal movement of the jaws 30 into gripping engagement with the pipe. Accordingly, each of the eccentrics 37 is provided with an annular member 37a in the illustrative form of a bushing which constitutes a bearing rotatably mounted upon the body of the eccentric 37. In addition, the eccentric supporting shafts 36 are rotatably supported in bearings 36a. With such a construction, the eccentric will revolve within the bushing 37a which will rotatably engage the surface of the wear pad 39a.

The wear pad 39a is so constructed as to enable the application of a substantially uniform radial force to the pipe gripping jaws, both in making up and breaking out pipe joints, notwithstanding the fact that the jaws 30 swing about the pivot supports 31 so as to normally tend to vary the effective cam angle between the eccentric 37 and the wear pad 39a when the eccentric is caused to revolve in opposite directions. More specifically, the wear pad 39a is provided with an arcuate cam surface which progressively declines from its outer extremity towards the pivot end of the jaws 30. Included in the surface of the wear pad 39a is a first portion 39b and a second portion 39c, the eccentric 37 acting on the portion 39b when rotated in a left-hand direction to effect closure of the respective jaws, and the eccentric 37 working on the portion 39c upon right-hand rotation of the eccentric to effect closure of the respective jaws. Rotation of the eccentrics 37 past the juncture of the camming surface portions 39b and 39c in either direction commences the reopening of the jaws, and therefore the die carriers 34 and dies 35 should be selected so as to effect gripping engagement with a pipe before the eccentrics 37 reach their position of maximum throw. When die carriers 34 are selected which will effect such gripping engagement of the pipe just prior to the point at which the eccentrics reach the position of maximum throw, the greatest radial force will be imposed on the jaws for the purpose of effecting high torque in making up and initial breaking out of pipe joints.

Means are provided for applying a drag to the inner ring 20, including a brake band 40 engaged with the outer annular wall 22 of the inner ring and suitably anchored as at 41 to the case section 15. In the illustrative head, means are provided for applying more or less braking force to the brake band 40, such means comprising, as best seen in FIG. 6, a brake actuator mechanism generally denoted at 42. This mechanism includes a supporting body 43 welded or otherwise made a part of the tong case and having therein a hydraulic actuator, including a cylinder 44 in which is reciprocally disposed a piston 45. Carried by the body 43 and revolvable in an end closure 43a is a brake adjuster screw 46 threadedly engaged in a hollow tube 46a disposed within a bore in the piston 45. This hollow tube 46a engages a stack of Belleville washers 47 constituting a spring engaged at one end with the tube 46a and at the other end with a piston extension 48, the extension 48 being welded or otherwise suitably connected to the anchor 49 at the other end of the brake band 40 from the anchor 41 whereby to maintain a normal constant braking force on the inner ring 20 sufficient to normally prevent rotation of the inner ring along with the outer ring 21, whereby, under normal circumstances, the rotation of the outer ring will cause actuation of the jaws 30 into and out of engagement with the pipe in response to reversals in the direction of rotation of the outer ring 21. In the event that additional braking force is necessary or desirable in order to establish or maintain a pipe gripping action, fluid under pressure may be supplied to the actuator cylinder 44 through a conduit 50 from a source of fluid pressure (not shown).

When the inner ring 20 is held stationary, the normal tendency of the jaw actuating means would be to move the jaws inwardly during the first 180° of revolution of the eccentrics 37 until the dies 35 engage a pipe in the central tong opening or, in the absence of such a pipe, to move the jaws inwardly during the first 180° of rotation of the eccentrics 37 and then retract the jaws cyclically and the inner ring 20, under these circumstances, would not rotate with the outer ring 21. In the presence of a pipe within the tong opening, the eccentrics 37 will move the jaws into engagement with the pipe during rotation of the outer ring 21 in one direction but, when it is desired to reopen the jaws, it is necessary to rotate the outer ring 21 in the opposite direction, the eccentrics 37, due to the fact that they are acting on the walls of the elongated slots 39, retracting the jaws.

Stop means are provided to prevent cycling of the jaw actuation. This stop means includes reversing stop means which will function to limit relative rotation of the inner and outer rings in one direction or the other, depending upon whether joints are being made up or broken out, to a position at which the jaws are fully opened. This stop means also includes, in the illustrative embodiment, stop means for preventing movement of the jaws inwardly in the event that no pipe joint is present between the jaws. This latter stop means cooperates with the reversing stop means so as to eliminate the possibility that, for example, a joint which has been made up will be re-engaged by the jaws as a result of cycling of the eccentric means and cause the joint to be partially broken out.

More particularly, the reversing stop means is best illustrated in FIGS. 6, 7 and 8. The reverse latch means includes a latch support 51, recessed in the outer wall 22 of the inner ring 20 and providing a chamber 52 in which is reciprocably disposed a stop body 53 having a V-shaped outer extremity 54 normally biased outwardly by a spring 55 to a position underlying the lower extremity of the outer ring 21. A pin 56 carried by the body 53 and sliding in a slot 57 is adapted to limit outward projection of the stop body. The stop body 53 has a further outward projection 58 which normally extends into an inner groove 59 in the outer ring 21. Cooperative with the outward projection 58, as best seen in FIG. 8, is a stop anvil 60 carried by the outer ring 21 and extending vertically across the just-mentioned groove 59, the anvil being retained in place within the outer ring 21 by a pin 62 and by angularly spaced lugs 63 between which the anvil is fit. It will now be apparent that the anvil will abut with the stop projection 58 at one side or the other of the latter, depending upon the direction of relative rotation between the inner and outer rings 20 and 21, respectively. In operation, however, it is desired that during the making up of pipe joints the anvil be at one side of the stop projection 58 so as to limit relative rotation between the inner and outer rings to a position at which the jaws are open, while during the operation of breaking out joints of pipe it is desired that the anvil normally be at the other side of the stop projection 58. Accordingly, means are provided for shifting the stop body 53 inwardly to retract the stop projection 58 from groove 59 in the outer ring, whereby to allow the anvil 60 to pass by the stop projection 58. The means for shifting the stop body 53 comprises means which are remotely operable and, in the illustrative embodiment, includes an actuator cylinder body 64 carried by the tong head frame and having an internal piston support 65 providing a piston chamber 66, in which is reciprocable a piston 67. This piston 67 supports a roller 68, and spring means 69 are provided for normally biasing the piston 67 outwardly in the chamber 66. However, the roller 68 is located at an elevation relative to the outward projection 54 of the stop body 53 such that, upon inward movement of the piston 67, the roller will be contacted by the projection 54 to force the stop body 53 inwardly in its chamber 52, thereby retracting the stop projection 58 out of the path of the stop anvil 60. Such inward movement of the piston 67 is accomplished by the application of fluid pressure to the piston chamber 66 through a conduit 70 leading from a source of fluid pressure at a remote location (not shown). In the normal operation of the tong assembly, the stop anvil 60 will be at a starting position adjacent one side of the stop projection 58 when pipe joints are to be broken out, so that the outer ring 21 will be free to rotate relative to the inner ring 20 to the extent necessary to effect actuation of the jaws 30, as aforesaid, into engagement with a pipe disposed in the tong opening and, thereafter, the inner and outer rings will rotate together as a unit, overcoming the drag of the brake band 40. When it is desired to release the pipe or open the jaws, and the outer ring 21 is caused to rotate in the opposite direction, the anvil 60 will re-engage the stop projection 58 and cause rotation of the inner and outer rings together when the jaws are in the full open position.

In order to assure that the jaw actuating eccentric 37 cannot cycle in the absence of a pipe within the tong opening, thereby allowing movement of the stop anvil 60 away from the stop projection 58 a distance greater than that required to effect inward movement of the jaws the maximum extent, the jaws are provided with stop projections 32a engageable with a stop member 32b to limit the maximum inward pivotal movement of the jaws, this stop member 32b being in the form of a bar or rod straddling the box-like inner ring assembly and welded or otherwise fixed in place.

It will now be understood that, inasmuch as with the stop means just described, namely the stop elements 32a and 32b, the jaws are prevented from moving inward to such an extent that the eccentrics 37 may pass over their positions of maximum throw; the outer ring 21 will be prevented from rotating relative to the inner ring 20 to such an extend that the jaw actuating eccentrics will cause reclosure of the jaws upon a pipe in the tong opening when the jaws are being opened. Thus, a pipe joint which has been made up cannot possibly be partially broken out inadvertently, and vice versa.

In order to protect the assembly and to assist in the guiding of the pipe P1 into the central tong opening, an upper guide is provided comprising a flange 71 positioned above the case section 14 and having a skirt 72 extending into the case and providing a tapered guide surface 73, whereby the pipe P1 will be guided into the tong opening as the pipe is lowered into a position for engagement of the jaws with the pipe or the tool joint pin end 1. The flange 71 and the guide member 72 are welded or otherwise made a part of the inner ring 20 and a seat is provided at 71a adapted to accommodate reduced diameter guides of different sizes which will serve to guide smaller diameter pipes and centralize them relative to the tong opening so as to protect the jaws and die holders carried thereby, which extend more or less into the tong opening when die holders of different radial dimensions are employed for handling different sizes of pipe. A reduced guide is herein illustrated whereby the die carriers 34 will be protected, such reduced guide comprising a body 71b having an upper flange 71c adapted to seat in the seat 71a, the body 71b having an internal taper 71d, and the body also having depending arms 71e which define windows 71f through which the jaws may pass for engagement of the pipe disposed within the tong opening. Another guide flange 75 is disposed beneath the tong assembly and provides a guide surface 76 to assist in guiding a pipe upwardly into the tong opening, as well as a seat 75a adapted to accommodate lower guides of smaller size. A similar reduced bottom guide is illustrated and includes a body 75b having a bottom flange 75c seating in the seat 75a of the bottom guide, the body 75b also having a tapered surface 75d, as well as upwardly extended arms 75e defining windows 75f. The arms 71e and 75e are disposed in alignment, as are the windows 71f and 75f, whereby the pipe joints are prevented from moving laterally while disposed in the tong opening into positions at which they might otherwise hang up upon the guide bodies.

In the normal operation of the tong assembly when it is desired to make up pipe joints, the pipe P2 will be engaged and held stationary by the back-up tong B, as will hereinafter be described, and the pipe P1 will be lowered or stabbed into the pipe P2. Thereupon, fluid pressure will be supplied to the motor 13 to drive the outer ring 21 in a right-hand direction, thereby, through the intermediary of the planetary gears 38 causing rotation of the eccentric shafts 36 and inward movement of the jaws about their pivots 31 until the tong dies engage the tool joint pin end 1, rotation of the jaw carrying inner ring along with the outer ring being prevented by the brake band 40 until the jaws tightly grip the pipe, at which time the inner and outer rings will rotate together to effect rotation of the pipe. After the pipe joint has been made up the motor 13 will be reversed, causing rotation of the outer ring 21 in a left-hand direction as the brake band 40 holds the inner ring 20 stationary. Such relative rotation will cause the jaws to be opened and will cause the stop anvil 60 to engage stop projection 58, thereby resulting in unitary rotation of the inner and outer rings to the left with the jaws in the full open position. The operation may be repeated until it is desired to break out a joint of pipe. In order to enable this latter operation, fluid under pressure will be supplied to the reverse stop actuator chamber 66 causing retraction of the stop projection 58 from the groove 59 in the outer ring 21 and, at the same time, the motor will be operated to drive the outer ring 21 in a left-hand direction so as to move the stop anvil 60 past the stop projection 58. Due to the presence of the secondary stops 32a and 32b, relative rotation of the outer ring and the inner ring in this direction is limited to a distance less than a full cycle of the eccentrics 37, inasmuch as the jaws are prevented from moving inwardly by engagement of stop 32a with 32b; and, when the direction of rotation of the outer ring is again reversed to reopen the jaws, the rings will rotate again together when the stop anvil 60 re-engages the stop projection 58 respectively carried by the outer ring and the inner ring. Thus, the tong head is conditioned for breaking out joints.

Figure 3C:
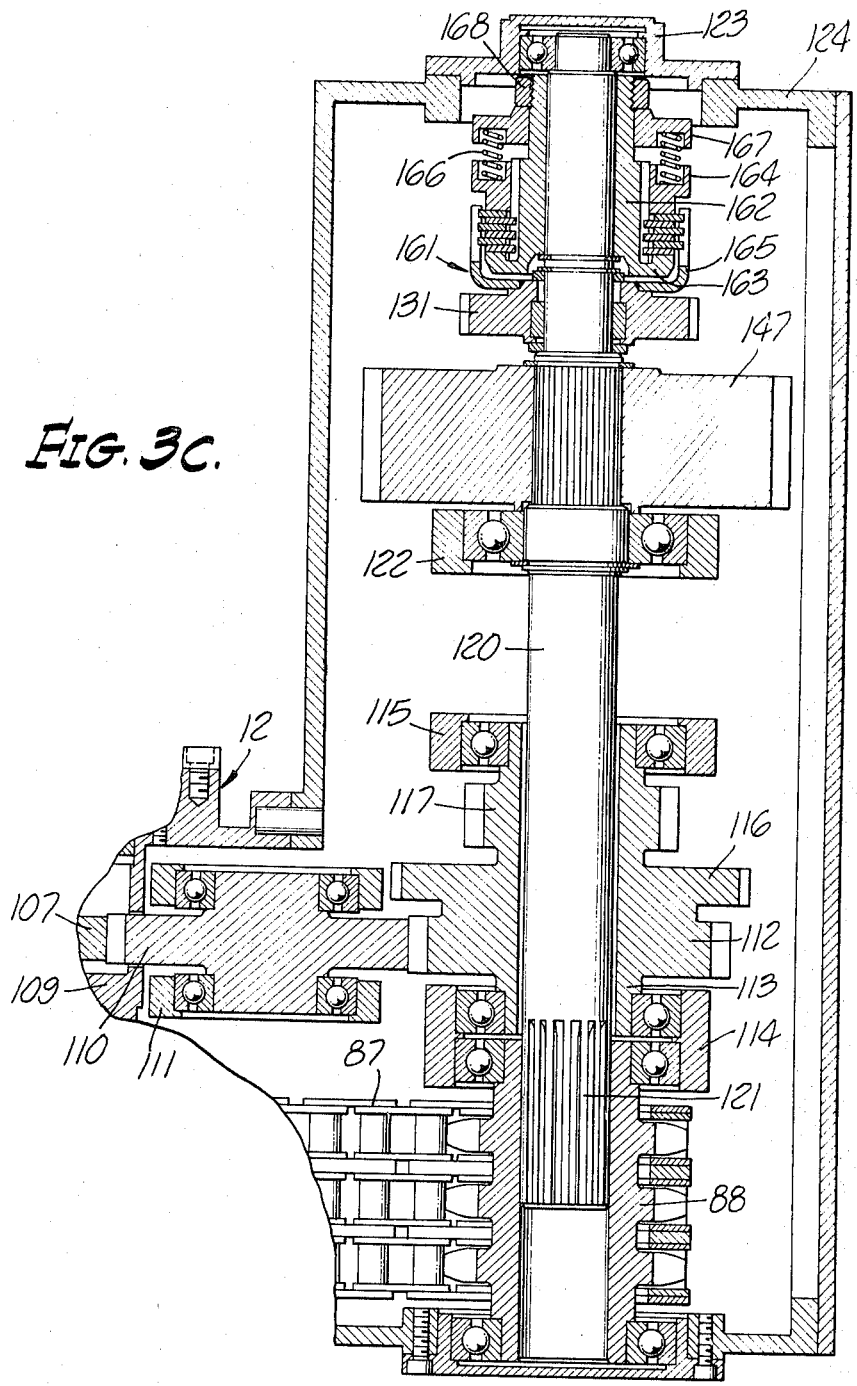
FIG. 3c is a rearward extension of FIG. 3b, showing the change speed drive mechanism for the transmission.

The means for driving the tong mechanism as thus far described are best illustrated in FIGS. 3b, 3c, 9 and 10. Referring first to FIG. 3b, it will be noted that the upper and lower tong case sections 14 and 15 are connected to horizontally extended case sections 14a and 15a which house an intermediate drive section, generally denoted 80, including the motor 13. This intermediate drive section includes the drive gear 28 previously described which is in mesh with the large outer ring gear 21, the gear 28 being an idler gear journalled upon a shaft 81 which is supported in a shaft support 82 mounted in the lower case section 15a and having an enlarged end 81a connected to the upper case section 14a. In mesh with the idler gear 28 is a gear 83, the hub of which is journalled upon a shaft 84 which is also supported in a shaft support 85 provided in the lower case section 15a, the upper end of shaft 84 having an enlarged end 84a connected to the upper case section 14a. Formed as a unit with the gear 83, that is, having a hub common with the hub of gear 83, is a sprocket 86 having a plurality of sprocket sections adapted to be driven by chain means 87. This chain means 87 preferably comprises a series of unitized chains respectively engaged with the sprocket sections. As best seen in FIGS. 3c and 10, the chain means 87 extends about a sprocket 88 which is also of the multiple sprocket section type and which forms a part of a change speed transmission mechanism, which will hereinafter be more fully described, and the chain means 87 extends about the sprockets 86 and 88 in a continuous or endless loop.

As best seen in FIG. 10, the endless loop of chain 87 is engaged by means whereby, as will hereinafter appear, the unloaded run of chain will be held taut and as the direction of drive through the intermediate drive mechanism 80 is reversed, the opposite unloaded run of chain will be held taut by an adjustable and automatically shiftable slack adjuster mechanism. This slack adjuster mechanism comprises a pair of similar lever arms 89 and 90, each having at their free ends idler sprockets, respectively designated 91 and 92. Lever 89 is provided with a hub 93 fulcrumed on a pin 94 which is disposed in a boss 95 provided in the lower case section 15a, the upper end of pin 94 being supported in a boss 96 extending inwardly from a supporting enlargement 97 secured to the upper case section 14a. The lever 90 is of similar construction and is supported similarly at its upper end in a boss carried by an enlargement 98 supported by the upper case section 14a. Like lever 89, the lever 90 has a multiple sprocket section 92 engaged with the chain means 87.

The means for loading the levers 89 and 90 toward one another so as to take up slack in the non-working run of the chain means 87 comprises a tie rod 100. The opposite ends of the tie rod 100 are disposed in blocks 101 and 102, each of which blocks has a cylindrical projection 103 therebelow extending through an opening in the respective levers 89 and 90 and retained in place as by snap ring 104. At one end of the tie rod 100 is an abutment in the illustrative form of a head 105, adapted to be engaged by a suitable tool for rotating the tie rod 100, the other end of the rod being threadedly engaged in the other block 102 so as to enable adjustment of the distance between the levers 89 and 90 by revolution of the head 105, with resultant revolution of the rod 100. It will now be understood that the relationship between levers 89 and 90 may be adjusted to apply more or less tension to the chain means extending between the sprockets 86 and 88, and that inasmuch as the levers are respectively freely pivotal about their supports, the working run of the chain means will extend in a straight line between the opposite sprockets while the slack will be taken up in the non-working run of the chain means, as best seen in FIG. 10 wherein the slack adjuster means is shown in a condition in which the sprocket 88 is being driven in a right-hand direction whereby, through the chain means 87, sprocket 86, gear 83, gear 28 and outer ring gear 21, the inner ring 20 will be caused to actuate its jaws to grip and rotate a pipe in a right-hand direction so as to make up a pipe joint. When a pipe joint is being broken out, the opposite run of the chain will be working and will extend in a straight line between the pulleys 86 and 88, while the other run of the chain will be deflected by the slack adjuster means.

Figure 9:
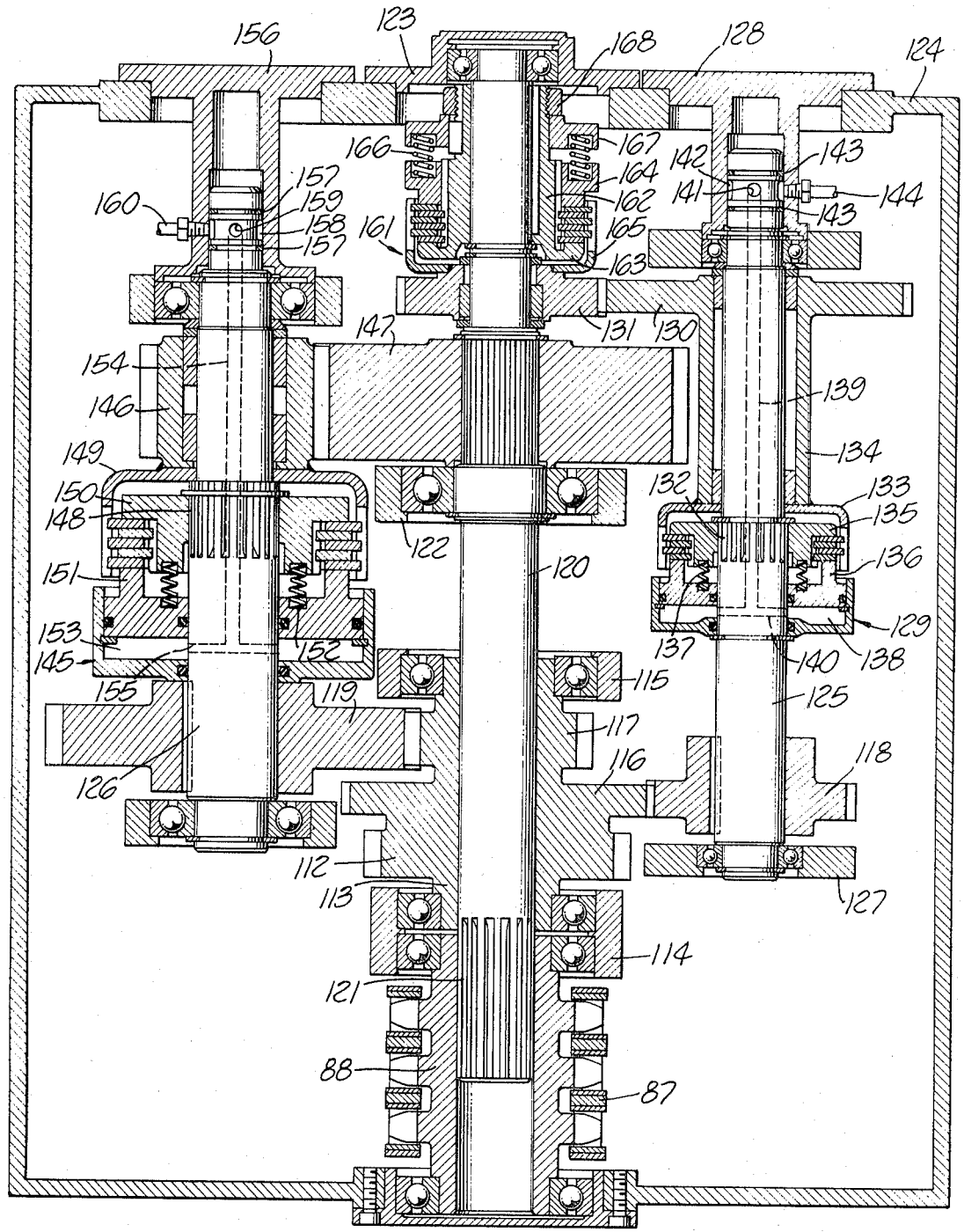
FIG. 9 is a transverse sectional view, as taken on the line 9—9 of FIG. 1.

The means for driving the sprocket 88 to effect such reversal of the operation of the tong mechanism comprises, as best seen in FIG. 3b, a power input gear 107 which is splined to the shaft 108 of the motor 13. Gear 107 is journalled in a bearing support 109 formed as a part of the upper case section 14a. An idler gear 110 journalled in a support 111 also formed as a part of the upper case section 14a, meshes with the drive gear 107 and also with the power input gear 112 of the change speed transmission mechanism. This input gear 112 has its hub 113 journalled in a lower support 114, the hub 113 extending upwardly and being journalled in a support 115 at its upper end. Integral with or otherwise made a part of the hub 113 is a large drive gear 116 and, spaced above the latter, a smaller drive gear 117 which are, respectively, as seen in FIG. 9, in mesh with a high-speed gear 118 and a low-speed gear 119. The power output from the transmission mechanism includes a central shaft 120 which is provided with a spline or other connection 121 with the above-described drive sprocket 88. This output shaft 120 extends rotatively through the hub 113 of gears 112, 116 and 117, and is journalled in a support 122 interiorly of the transmission case 124 as well as its upper end, in a bearing support 123 in the upper wall of the case.

In parallel relation to the output shaft 120 are drive shafts 125 and 126 on which are respectively mounted the high-speed gear 118 and the low-speed gear 119. The shaft 125 is journalled in an internal support 127 and in an upper end support 128 disposed in the upper case wall 124. Means are provided for establishing a drive connection between the shaft 125 and the output shaft 120 when it is desired to drive the tong head at high speed and low torque, such as when pipe is being spun to initially make up a pipe joint or to spin a joint out, this means comprising a fluid-pressure actuated clutch mechanism, generally denoted at 129, which is adapted, when engaged as will be hereinafter described, to drive a gear 130 which is normally freely journalled about the shaft 125 and which is in mesh with a gear 131 which is drivingly connected with the output shaft 120. The clutch means 129 may be of any desired fluid-pressure actuated type; in the illustrative embodiment, the clutch means 129 will be seen to include a drive member 132 keyed to the shaft 125 and a driven member 133 welded or otherwise suitably connected to a downwardly extended hub section 134 of gear 130. The clutch drive member 132 has a plate 135 opposing an actuator piston 136, and between the plate 135 and piston 136 is a stack of coengageable friction plates, alternate plates of which are driven by the drive member 132 and carried by the driven clutch member 133 in the usual manner. A number of spring 137 are interposed between the drive member 132 and the piston 136 normally biasing the latter away from the plate 135 so that the clutch is normally disengaged. Means are provided for admitting fluid under pressure to a piston chamber 138 behind piston 136, so as to force the latter in a clutch-engaging direction. In the illustrative embodiment the shaft 125 has a central fluid passage 139 leading downwardly therethrough to a suitable number of radial ports 140 leading between the passage 139 and the piston chamber 138. At its upper end the passage 139 communicates with a suitable number of ports 141 formed in the upper end of the shaft 125 and communicating with a pressure fluid chamber 142 defined between appropriate sealing means 143 within a bore provided in the support 128. Fluid under pressure may be supplied to the clutch 129 by a conduit 144 leading from a suitable source of pressure fluid which is under the control of an operator at a remote location. Thus, when the operator desires that the tong assembly be driven through shaft 125, clutch means 129, gear 130, gear 131 and output shaft 120, the operator will cause the application of fluid pressure to the clutch 129. During this time the low-speed gear 119 will idle, as will be apparent from the following description of the low-speed drive.

This low-speed drive is provided with another fluid-pressure operated clutch means 145 which, when engaged as will be hereinafter described, will establish a driving connection between the low-speed gear 119 and a gear 146 journalled about the low-speed shaft 126 and engaged with a large gear 147 which is keyed or otherwise connected to the output shaft 120. The clutch 145, like clutch 129, may be of any desired type and, also like clutch 129, is illustrated as including a drive clutch member 148 keyed to the shaft 126 and a driven clutch member 149 which is welded or otherwise connected to the gear 146. Clutch drive member 148 has a plate 150 opposed by a piston 151, and a stack of friction discs alternately connected to the drive member 148 and the driven member 149 are interposed between the plate 150 and the piston 151 so as to effect engagement of the clutch 145 and driving of the gear 146 by the shaft 126. A suitable number of springs 152 are provided for normally disengaging the clutch 145, and a pressure chamber 153 is provided behind the piston 151 to effect engagement of the clutch. Also, as in the case of the clutch 129, the shaft 126 is provided with a central passage 154, and radial ports 155 lead from the passage 154 into the piston chamber 153. At its upper end the shaft 126 is disposed in a shaft supporting member 156 carried by the upper wall of the transmission case 124, and suitable seals 157 isolate a chamber 158 which communicates with the passage 154 in shaft 126 through radial ports 159. Fluid under pressure may be admitted to the chamber 158 to actuate the clutch 145 through a suitable conduit 160 leading from a source of fluid under pressure at a remote location, and whereby the operator may, when desired, cause engagement of the clutch means 145 while the clutch means 129 is disengaged so as to effect a low speed drive from input gear 112 through gear 117 to gear 119 which will drive gear 146 through the clutch 145, so that gear 147 will then drive output shaft 120 and sprocket 88 at a relatively low rate of speed but at high torque.

In the making up of pipe joints, particularly drill pipe tool joints and drill collar joints, as is well known in the art, the threaded joints are normally relatively rotated at high speed, this being generally referred to as "spinning," and when the tool joint shoulders there is instantaneous shock loading of the drive mechanism due to the abrupt increased resistance to rotation. In accordance with the present invention means are provided for disconnecting the high speed-low torque drive from the output shaft 120 when such abrupt resistance is encountered so as to protect the high-speed drive from the effects of such instantaneous loading of the drive gears. As previously indicated, the high-speed output gear 131 is drivingly connected to the output shaft 120 but slip clutch means, generally denoted at 161, are provided for normally establishing a drive between the gear 131 and the output shaft 120, which drive will slip when subjected to instantaneous, heavy torque loads. The slip clutch means may be of any desired form, but is preferably a spring-loaded clutch, the spring-loading of which may be varied as may be required during operation of the tong assembly. The illustrative slip clutch means 161 comprises a drive member 162 keyed or otherwise suitably connected to shaft 120, and having a stationary plate 163. Opposing the stationary plate 163 is a pressure plate 164, and interposed between the pressure plate and the stationary plate is a stack of friction discs, of which alternate discs are connected to the clutch drive member 162 and to a clutch-driven member 165 which is welded or otherwise suitably connected to the gear 131. A suitable number of springs 166 engage the pressure plate 164 to normally load it towards the stationary plate 163 to normally hold the clutch in engagement. An annular spring seat 167 is disposed about the clutch drive member 162 in a position relative to the stationary clutch plate 163 determined by the relative axial adjustment of an adjuster collar 168 threadedly connected to the clutch drive member 162 and serving as an adjustable stop for the spring seat 167, whereby the effective spring force may be adjusted. It will be apparent that the upper shaft support 123 for the output shaft 120 may be removed from the upper wall of the transmission case 124 to afford access to the adjuster collar 168 when desired or necessary.

In the operation of the power tong including a power transmission mechanism as herein disclosed, it will now be understood that power fluid will be supplied to the motor 13 and actuating fluid for the clutch means 129 and 145 will be supplied thereto from a remote location by an operator who may control the direction in which the tong mechanism will be driven by reversing the flow of power fluid to the reversible motor 13, as will be hereinafter described, and who may select the drive to the tong head in either direction by either effecting engagement of the high-speed drive clutch means 129 or the low-speed drive clutch means 145. Thus when, for example, drill pipe is being run into a well, the operator will cause right-hand rotation of the tong mechanisms so that the outer ring 21 thereof will cause closure of the jaws 30 upon the tool joint 1 of the pipe P1, pursuant to which the tong head will rotate to the right at high speed until the tool joint 1 shoulders with the tool joint 2 of the pipe P2. Upon the shouldering of the tool joints 1 and 2 the slip clutch means 161 will allow the high-speed drive to slip so that the high-speed drive gears will not be adversely affected by the sudden resistance to further rotation. Thereupon the operator may cause the high-speed clutch means 129 to be disengaged and cause the low-speed drive clutch means 145 to be engaged so as to impose a high torque, low speed further rotation upon the tool joint 1 relative to the tool joint 2, so as to make the joint up tight.

Alternatively, if the pipe is being pulled from the well it will be understood that the operator will cause rotation of the tonging mechanism to the left through the low-speed high torque drive to initially break out the tool joint; thereafter the operator may release the low-speed drive through clutch 145 and effect engagement of the high-speed drive through clutch means 129 so that the tool joint 1 will be rapidly rotated to disengage all of its threads from the tool joint 2 by a spinning action.

The back-up tong B included in the combined power tong and back-up tong assembly hereof, as best illustrated in FIGS. 2 and 11, includes a support structure 201 comprising an elongated hollow case 202 supported at its rear end 203 by a post 204 depending from the power tong T. If desired, as will be appreciated by those skilled in the art, the post 204 may extend through a chamber 205 so as to be engaged by a pressure foot 206 of a force sensing hydraulic device 207 having a conduit 208 leading to a gauge which will show the angular force applied to the back-up tong B tending to cause angular movement of the support structure 201, as an indication of the make up torque applied to pipe joints held by the back-up tong, as will hereinafter be described, and rotated by the power tong assembly T.

At the forward end of the support structure 201 is a back-up tong head assembly generally denoted at 209, the support structure 201 including brackets 210 connected to ears 211 formed as part of the head assembly 209 by bolts 212. This head end of the back-up tong assembly is also, in the illustrative embodiment, supported beneath the power tong assembly T by means of ears 213 projecting from the sides of the tong assembly T and supporting bolts 214 which extend through outwardly extended gussets 215 carried by the support structure 201, coiled springs 216 being provided between the gussets 215 and the ears 213 to cushion relative vertical movement between the head 11 of the power tong T and the head 209 of the backup tong B.

The backup tong head assembly 209, as seen in FIGS. 11 to 18, includes a member 217 which is in the form of a plate having an external marginal reinforcing flange 218 and an internal marginal flange 219, and the ears 211 previously described, by which the backup tong head 209 is carried at the head end of the support structure 201, being provided on the outer peripheral flange 218 of the plate member 217, so that the latter constitutes what will be characterized herein as a stationary ring. This stationary ring 217 supports a relatively rotatable ring assembly generally denoted at 220. The ring assembly 220 comprises an upper plate 221 and a lower plate 222 of generally triangular form, but truncated at the apices so as to generally conform to the circular form of the stationary plate 217. At a suitable number of angularly spaced locations the plates 221 and 222 are provided with opposing internal bosses 223 and 224 through which extend connecting bolts 225, and, at such locations, each of these plates may be further provided with axially extended arcuate flanges 226 and 227 which define therebetween radially opening windows 228 (see FIGS. 13, 14, and 17).

The pipe gripping means comprise a plurality of jaws generally denoted at 230 which are adapted to be shifted through the windows 228 between retracted positions and inwardly projected positions at which the jaws 230 will engage a pipe joint part, such as the joint part 2 of the pipe P2. These jaws 230 each comprise a generally U-shaped body having an inner vertical end wall 231 and upper and lower walls 232 and 233, respectively, these latter walls extending radially into overlying and underlying relation to the stationary plate 217. The end wall 231 of each of the jaws 230 is, as best seen in FIGS. 14 and 16, provided with recesses 234 and 235, respectively, adapted to receive complemental ears 236 and 237 which project outwardly from the upper and lower ends of a die carrier 238, the latter having a vertically disposed slot 239 adapted to receive a pipe engaging tong die 240 of suitable construction, the tong dies respectively being held in the slots 239 by fasteners 241. It will also be noted that the inner end walls 231 of the jaws 230 are also provided with tong die slots 242 adapted to receive dies similar to the dies 240, but that die carriers 238 of different radial projection may be associated with the respective jaws 230 so as to enable the jaws to effectively engage pipe or pipe joints over a wide range of sizes, the illustrative die carrier 238 being adapted to engage an intermediate range of pipe sizes, while larger pipe sizes would be engaged by dies in the jaw slots 242 and the carriers 238 would be removed. In order to releasably secure the die carriers 238 on the end walls 231 of the jaws 230, the ears 237 of the die carriers are provided with openings adapted to accommodate locking screws 243, as seen in FIG. 16.

When the jaws 230 are fully retracted, it will be noted that the end walls 231 thereof would be radially outward from the inner periphery 244 of the top plate 221 and the inner periphery 245 of the bottom plate 222 of the rotatable ring assembly 220, but when a die carrier, such as the die carrier 238, is provided on the jaws 230 the die carriers will project radially inwardly relative to the peripheries 244 and 245 of plates 221 and 222, respectively. Thus, guide means are provided within the inner peripheries of the plates 221 and 222, including an annular body 246 having windows 247 adapted to register with the windows 228 provided between the inner walls 226 and 227 of the plates 221 and 222. The guide body 246 has an inner periphery which projects inwardly beyond the dies 240 in die carriers 238 so as to prevent engagement thereof by a pipe joint or pipe end. Beneath the guide body 246 is an outwardly extended flange 248 adapted to be secured by fasteners 249 to the bottom plate 222 of the rotatable ring assembly 220. In order to substitute or remove the die carriers 238 from the jaws 230, as best illustrated in FIG. 12, the guide fasteners 249 must be removed to allow slight angular movement of the guide relative to the ring assembly 220, whereby to expose in guide flange notches 250 the fasteners 243 which secure the die carriers 238 to the jaw walls 231, but when the guide is in fastened position, the flange 248 at least partially overlies holes 243a in the bottom plate 222 of the ring assembly 220 which are aligned with the fasteners 243 so as to preclude loss of these fasteners from the assembly during use.

Means are provided for effecting the retraction and radial projection of the jaws 230 to pipe engaging positions. Such means includes a cam ridge 251 formed as at least the lower portion of the inner marginal flange 219 of the stationary plate 217, and a roller 252 engaged with one side of the ridge 251, as well as a roller 253, engaged with the other side of the ridge 251. The roller 252, in the illustrative embodiment, is a large roller disposed between the upper and lower walls 232 and 233 of the jaws 230 and rotatably supported on a shaft 254 extending between the latter walls. The roller 253 in each jaw is a smaller roller journalled on a stud 255 extending upwardly through the lower wall 233 of the jaw 230. As best seen in FIG. 13, the cam ridge 251 is a continuous ridge having three similar segments, each cooperative with the rollers 252 and 253 to effect movement of the respective jaws between the aforementioned retracted and inwardly projected positions. Each segment of the cam ridge 251 includes a central depression 251a and a pair of similar arcuately extended camming walls 251b and 251c extending arcuately from the central depression 251a. These walls 251b and 251c respectively merge with the walls 251c and 251b of the adjacent cam ridge segments at points designated 251d. In radial alignment with the central depressions 251a, each of the cam ridge segments is provided with an outwardly extended protuberance 251e, so that, as will be more fully understood hereinafter, the terminal stages of movement of the jaw carrying ring assembly 220 in a direction to cause retraction of the jaws will cause the rollers 252 to be seated in the central depressions 251a between the respective camming surfaces or walls 251b and 251c. In this connection, it will now be apparent that angular movement of the ring assembly 220 in either direction when the jaws 230 are in the positions shown in full lines in FIG. 13 will result in said jaws being cammed by the action of the rollers 252 on either cam wall 251b or cam wall 251c of the respective camming ridge segments inwardly towards a pipe located within the central opening of the tong head defined by the guide body 246, as shown in broken lines in FIG. 13. It will also be appreciated that reversal of the direction of angular movement of the jaw carrying ring 220 will effect retraction of the jaws 230 by the action of the rollers 253 on the outer walls of the respective camming ridge segments.

Inasmuch as the jaws 230 will project more or less inwardly into the tong head opening, depending upon the size of the pipe joint disposed therein, guide means are provided for the respective jaws, which guide means are adapted to cock slightly so as to maintain full facial contact with the jaws when torque applied to the pipe tends to cause cocking of the jaws within the guide means for the jaws. This guide means comprises, in association with each of the jaws 230, upper and lower guide pads 256 and 257, respectively, disposed in pad supports 258 and 259, a pivot pin 260 pivotally mounting the respective pads 256 and a pivot pin 261 pivotally mounting the respective pads 257 in their supports 258 and 259 for slight angular movement, these pads 256 and 257 slidably engage the jaws 230 along their side walls and each of the pads 256 and 257 may adjust angularly so as to maintain facial contact with the jaws as the latter are caused to cock slightly angularly in response to engagement with the pipe when the latter is subjected to angular forces.

Actuator means generally denoted at 265 are provided for effecting angular movement of the jaw carrying ring assembly 220, as aforesaid, in opposite jaw closing directions, from the fully retracted jaw positions, as well as for effecting angular movement of the ring assembly 220 in opposite jaw retracting directions. This actuator means 265 includes a fluid pressure operated actuator cylinder 266 which is pivoted centrally of the support structure 201 and in rearwardly spaced relation to the head 209 on a pivot pin 267 supported in a bracket 268, as seen in FIG. 11. Projecting from the actuator cylinder 266 is an actuator rod 269 adapted to be connected to the ring assembly 220 at one location at one side of a center line extending from pivot pin 267 through the center of the tong head in order to force the ring assembly 220 in one angular jaw closing direction, and, alternately, to be connected to the ring assembly 220 at the other side of said center line to cause angular movement of the ring assembly 220 in the other angular jaw closing direction, retraction of the rod causing reverse jaw opening angular movements of the ring assembly 220. As best seen in FIGS. 13 and 18, the rod 269 is connected to a block 270. This block 270 has a head 271 which is disposed between a pair of plates 272 and 273. Plate 272 is formed as part of, or connected to, a mounting bracket 274 which is secured as by fasteners 275 to an upwardly extending reinforcing side wall 276 extending along the margin of the lower plate 222 of the ring assembly 220. The plate 273 likewise is formed as part of, or connected to, a mounting bracket 277 which is secured as by fasteners 278 to the just-mentioned side wall 276. Plate 272 has an elongated arcuate slot 279, and plate 273 has a correspondingly elongated arcuate slot 280, in which vertical extensions of the head 271 of block 270 are disposed. The opposite ends of the slots 279 and 280, as indicated at 281 and 282 in FIG. 13, constitute abutments engageable by the head 271 to limit movement of said head relative to the plates 272 and 273.

Means are provided for shifting the head 271 between the limits provided by the slot ends 281 and 282, including a fluid pressure operated actuator cylinder 283 pivotally supported at one end on a bracket 284, the cylinder 283 having a rod 285 connected by a pin-and-slot lost motion connection 286 to a lever arm 287 projecting from the pivoted end of the ring actuator cylinder 266. Accordingly, when rod 285 is retracted into cylinder 283, the actuator cylinder 266 will be caused to swing about its pivot 267 from the position shown in FIG. 13, at which the head 271 is engaged with the abutment 282, to the other end of the slots into engagement with the abutment 281. Conversely, when the actuator rod 285 is projected from the cylinder 283, opposite pivotal movement of the ring actuator cylinder 266 will occur. Thus, the actuator cylinder 283 and its rod 285 constitute means for shifting the ring actuator cylinder 266 to the above-mentioned opposite sides of the center line extending between pivot pin 267 and the center of the tong head 209. In addition, the lost motion connection 286 constitutes means enabling the ring actuator cylinder 266 to operate to move the ring assembly 220 in either direction without interference from the connection of the rod 285 to the lever arm 287, by which actuator cylinder 266 is caused to pivot between its two operative positions.

Means are provided for releasably latching the head 271 in its respective extreme positions. Accordingly, the head 271, as seen in FIG. 18, is provided with a bore 288 in which is disposed a latch pin 289, the upper end of which is adapted to extend into a pin opening 290 provided in a plate 291 mounted on the slotted plate 272 adjacent the abutment 281, when the head 271 is in that position. Adjacent the abutment 282 the latch pin 289 is adapted to engage in a pin opening 292 in a plate 293 carried by the slotted plate 272. Means are provided for retracting the pin 289 from the pin openings 290 and 292 and, in the illustrative embodiment, the pin 289 is provided with a piston portion 294 disposed in the bore 288; and the block 270 is provided with a fluid passage 295 leading from a fluid conduit connector 296, whereby fluid under pressure may be admitted to the bore 288 above the piston 294 to force the pin 289 downwardly against the force of a spring 297 which normally biases the pin 289 into latching engagement with either of the plates 291 or 293 when the head 271 is in either of the positions adjacent abutment 281 or 282.

Figure 19:
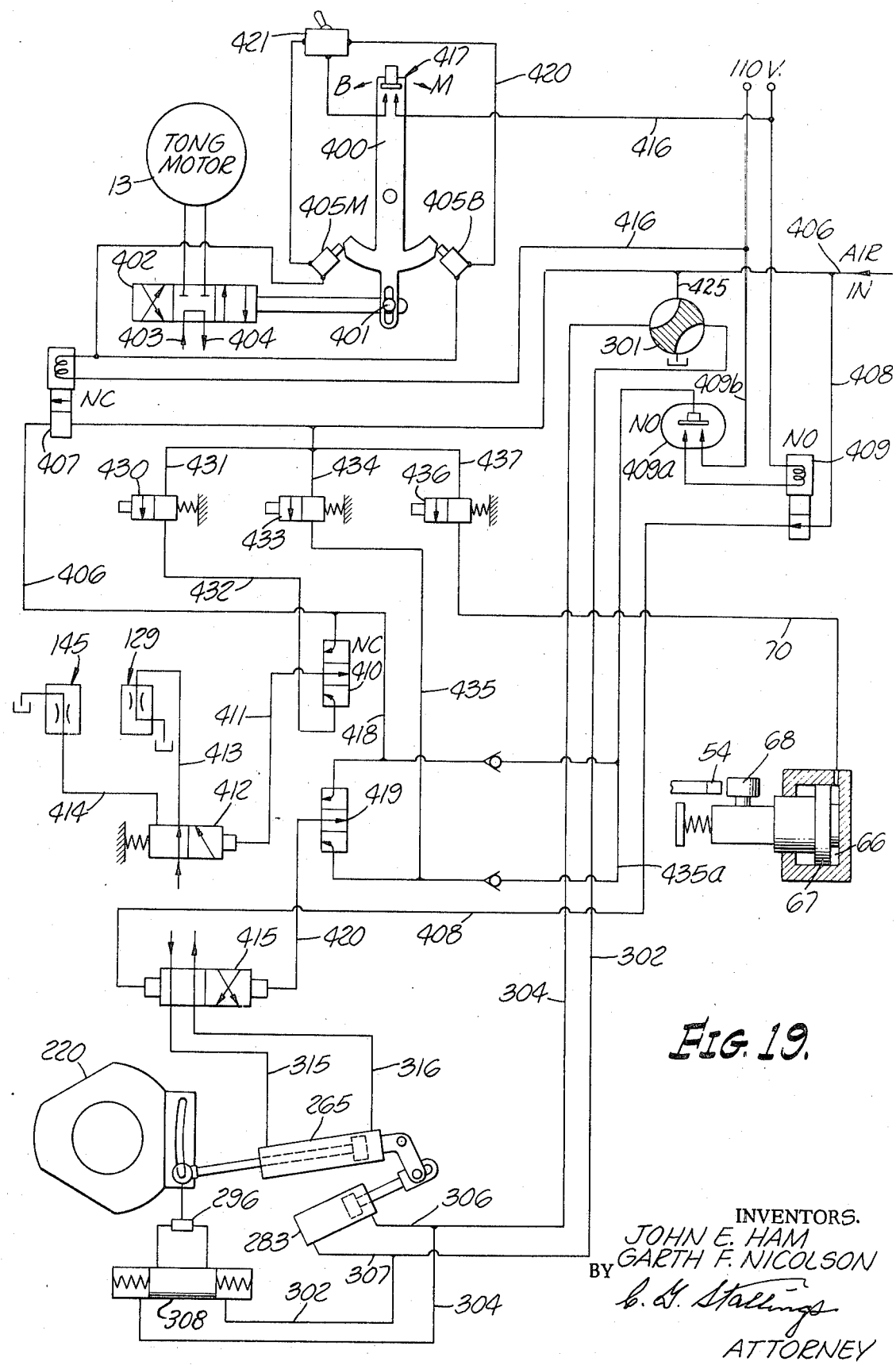
FIG. 19 is a schematic illustration of the control system for effecting operation of the power tong and backup tong.

Referring now to FIG. 19, there is illustrated a control system by which the power tong T and the back-up tong B are caused to operate in a preferred manner. In this connection the general mode of operation of the combined tong assembly would involve the driving of the power tong T in either a make up or break out direction, while controlling the speed of rotation and the force applied to the pipe joint by the power tong through the high speed, low speed clutch mechanism previously referred to, and causing the back-up tong to be closed when pipe joints are being made up only during the low speed, high torque phase of the power tong operation, as well as causing closure of the back-up tong only during the low speed, high torque phase of operation of the power tong in the joint break out direction. Also included in the system would be control means for effecting operation of the reverse latch shifting mechanism, and more particularly for controlling the application of fluid pressure to the chamber 66 thereof; and the system would also preferably include a low speed override means whereby the power tong T may be driven in either direction at low speed and high torque without effecting engagement of the back-up tong B, as well as override means whereby the back-up tong may be closed even though the power tong may be conditioned for high speed, low torque drive.

The control system involves, in the illustrative embodiment, an electro-pneumatic control system for controlling the application of hydraulic fluid pressure to the power tong motor 13, to the high speed and low speed clutch assemblies 129 and 145, respectively, to the back-up tong closing and opening cylinder means 265, to the cylinder means 283 which acts to shift the back-up tong actuator cylinder between its different operative positions, as previously described, and to the releasable latch means, including the latch pin 289, whereby the actuator cylinder 265 is operatively connected to the back-up tong rotatable ring assembly 220.

Accordingly, a power tong control lever 400, which is adapted to be located at a remote location under the control of an operator, is provided with an operative connection at 401 with a valve assembly schematically illustrated at 402, whereby when the lever 400 is in a neutral or intermediate position, motor power fluid from a source conduit 403 merely circulates back to a reservoir (not shown) via a conduit 404. However, when the lever 400 is shifted to the right, as seen in FIG. 19, so as to cause driving of the power tong motor 13 in a direction to effect the making up of pipe joints, the valve assembly 402 will be shifted to effect right-hand rotation of the motor 13, as shown in the schematic system. Alternatively, when the lever 400 is shifted to the left, the valve assembly 402 will be actuated to effect rotation of the motor 13 to the left, in a direction to effect the break out of pipe joints.

The lever 400 is provided with means cooperative with a pair of switches, one of which is designated 405M and the other of which is designated 405B. It will be noted that actuation of the lever 400 in the make up direction would effect closure of switch 405M and that actuation of the lever 400 in a break out direction would effect closure of the switch 405B, both of these switches being normally open. It is the purpose of these switches to control the closure of the back-up tong B in such a manner that, when the power tong T is in low gear and is being caused to rotate in the make up direction responsive to shifting of the lever 400 as aforesaid, the back-up tong B will also be closed, but, when the lever 400 is shifted to the left past the mid position at which the motor 13 would idle and further to the break out position so as to effect opening of the jaws 30 of the power tong T, the back-up tong B will also be caused to open, notwithstanding the fact that the power tong low speed drive is engaged.

The closure of the back-up tong B in response to operation of the power tong T in the low speed mode is accomplished by air supplied to an inlet conduit 406 from a suitable source (not shown). This conduit 406 leads to a normally closed solenoid-operated valve 407. A branch conduit 408 leads from the inlet conduit 406 to a normally open solenoid-operated valve 409. Conduit 406 leads from solenoid valve 407 to a normally closed air-operated shuttle valve 410 having an outlet conduit 411 leading to a control valve 412, by which the flow of hydraulic fluid from a source (not shown) is supplied via a conduit 413 to the high speed clutch means 129 so that the latter is normally engaged. However, when control air pressure is applied to the control valve 412, it will be shifted to the alternate position at which hydraulic fluid will be supplied to the low speed clutch means 145 via a conduit 414, the fluid pressure to the high speed clutch means 129 being shut off. Control air pressure normally will flow from the normally open solenoid valve 409 through the conduit 408 to one end of air-actuated valve means 415 so that the same is normally held in a position at which hydraulic fluid under pressure from a source (not shown) flows to the end of back-up tong actuator cylinder 265, which will hold the back-up tong open. Thus, it will be apparent that the back-up tong is normally open but, as will now appear, is closeable in response to the opening of normally closed solenoid valve 407 and the closing of normally open solenoid valve 409. In this connection, the solenoid valve 407 is in a circuit generally denoted at 416 with a normally open switch 417 which, for convenience, may comprise a push-button switch, at the top of lever 400. Closure of the switch 417 will cause energization of solenoid valve 407 to shift it so that, as indicated above, the low speed clutch means 145 of the power tong T will be engaged by the flow of air through the shuttle valve 410 into conduit 411, and the flow of control air via conduit 408 to valve 415 will be shut off in response to energization of solenoid valve 409. Solenoid valve 409 is energized in response to closure of a normally open pressure responsive switch 409a connected to the solenoid valve by a circuit 409b and closeable in response to the application of pressure thereto derived from a conduit 418 leading from the conduit 406 in advance of the shuttle valve 410. Closure of the normally open solenoid valve 409 shuts off the flow of air through conduit 408 to the valve 415, whereby the pressure fluid flow to the backup tong actuator cylinder 265 normally holds the backup tong open and, in order to close the backup tong, the valve 415 will be shifted to the alternate position of FIG. 19. To effect this function, the conduit 418 of the air system leads also to an air-operated shuttle valve 419, whereby to allow the flow of control air through a conduit 420 leading from the valve 419 to the valve 415 so that the latter will automatically be shifted to the above-mentioned alternate position and the backup tong will be closed.

Thus, the backup tong B will be closed whenever the switch 417 is closed, under which circumstances the low speed clutch 145 will be engaged in the power tong T, whether the lever 400 be moved in a make up or break out direction.

Assuming that the lever 400, under the just-mentioned circumstances, is moved in a make up direction, i.e., to the right, as seen in the illustration, and the switch 417 is closed, then the switch 405M will also be closed so long as the lever 400 is held in the make up position, but when the lever 400 is moved in the opposite direction past the mid point and to break out position so as to open the power tong jaws, as aforesaid, the switch 405M will be opened thereby opening the circuit to the normally closed solenoid valve 407 so that this valve will assume its previously described normal position and the backup tong B will be automatically opened, inasmuch as closure of solenoid valve 407 will prevent the further application of pressure to switch 409a whereby to hold closed the normally opened solenoid valve 409. Under these circumstances it will now be apparent that the backup tong will always be open when the jaws of the power tong are being opened, unless a backup tong override means is operated, as will hereinafter be described.

Conversely, it will be apparent that when the lever 400 is shifted in the break out direction the switch 405B will be closed and will remain closed until the lever 400 is moved back again to the neutral or mid position. These switches 405M and 405B are in a circuit generally denoted at 420, with the circuit 416 including the switch 417, and in the circuit 420 is a selector switch 421 by which the switch 417 is selectively placed in series with the switch 405M or the switch 405B, depending upon the setting of the selector of the selector switch 421. Thus, when joints are being made up the selector switch 421 will place the switch 405M in circuit with the switch 417, but when joints are to be broken out the selector switch 421 will be operated to place the switch 405B in circuit with the switch 417.

In addition, when it is desired that the tong combination be operated to make up pipe joints, the backup tong actuator cylinder 265 will be positioned, as shown in FIG. 19, so that the backup tong jaw carrying head assembly 220 will be caused to rotate in a right-hand direction upon the application of fluid pressure via the conduit 316 to the actuator cylinder 265. However, when it is desired that the tong combination be employed to break out pipe joints, then it is necessary that the actuator cylinder 265 be shifted to its alternate position, as previously described, by the shifting cylinder 283. In order to accomplish this, fluid under pressure will be supplied from the inlet conduit 406 through a branch conduit 425 through a suitable selector valve means denoted at 301, so that air under pressure will pass through a conduit 304 and a conduit 302 and will be exhausted. Conduit 304, as previously described, leads to the pressure chamber of the latch pin retracting means whereby pin 289 (see FIGS. 13 and 18) will be retracted; and leading from the conduit 304 is a conduit 306 whereby pressure fluid will be applied to the shifting cylinder 283 when the pin 289 is retracted so as to cause shifting of the backup tong actuator cylinder 265 to the other side of a center line extending through the backup tong jaw carrying head 220, whereby the subsequent application of backup tong closing pressure to the cylinder 265 will effect left-hand rotation of the jaw carrying head 220. It will now be apparent that when the selector valve 301 is shifted to its alternate position, air from conduit 425 will pass through the valve 301 to conduit 302, which will also effect retraction of the latch pin 289; and leading from the conduit 302 to the opposite end of shifting cylinder 283 from conduit 306 is a conduit 307, whereby the cylinder 283 will be operable to shift the backup tong actuator cylinder 265 from the position at which it actuates the head 220 in a left-hand direction to a position at which the head 220 will be actuated in a right-hand direction, as shown in FIG. 19.

A shuttle valve 308 is provided for blocking the exhaust of operating fluid pressure from the pressure chamber for the latch pin 289 so that, when pressure is supplied through either of the conduits 302 and 304, exhaust through the other of said conduits 302 and 304 will be prevented; but the latch pin chamber will normally be exhausted in the absence of pressure supplied from either of the conduits 302 and 304.

Also included in the control system to enable driving of the power tong T at low speed and high torque, without closure of the switch 417, is low speed override means including a normally closed, manually operable valve 430, and a conduit 431 leading from the supply or inlet conduit 406 to the valve 430. When valve 430 is opened, air will be supplied through a conduit 432 to the shuttle valve 410 to shift the same in a direction so as to enable air from the conduit 432 to pass into conduit 411 so as to shift the low speed clutch engaging valve 412, as previously described. Thus, the power tong T may be driven at low speed and high torque while the backup tong B remains open. Additionally, means are provided for effecting closure of the backup tong B, even though the power tong T be in neutral or high speed, low torque drive. This means includes a manually operable valve 433 which is normally closed but which is openable to allow the passage of air derived from the inlet 406 via a conduit 434, a conduit 435 leading from the valve 433 to the shuttle valve 419 so as to shift the latter to a position allowing such fluid under pressure to flow through conduit 420 to the valve 415 which controls the application of hydraulic pressure to the backup tong actuator cylinder 265. In order to close the normally open solenoid valve 409 in response to opening of the back-up override valve 433, a branch conduit 435a leads from the conduit 435 to the pressure-sensitive switch 409a so as to close the same. Thus, if the override valve 433 is opened, the backup tong will be closed, irrespective of the closure of the switch 417 on the power tong control lever 400.

When it is desired to condition the power tong assembly T to break out joints after having made up joints therewith and vice versa, the reverse stop means is actuated, as previously described, by the application of fluid pressure to the chamber 66 through the conduit 70. This conduit 70 leads from a normally closed, manually operable reverse latch operating valve 436, to which air is supplied via a conduit 437 leading from the inlet or supply conduit 406. Thus, the power tong T is adapted to be conditioned for reverse operations from a remote location by the tong operator.

In the use of the power tong assembly T in combination with the backup tong assembly B, as described above, and under the control of the system shown in FIG. 19 and assuming that pipe joints are to be made up, the length of pipe P1 will be stabbed into the length of pipe P2. Thereupon the operator will move the lever 400 in the make up or right-hand direction but without closing switch 417, resulting simply in the movement of valve 402 to a position at which hydraulic fluid from conduit 403 drives the motor 13 in a right-hand direction. Inasmuch as the high speed clutch means 129 is normally engaged, as clearly illustrated in FIG. 19, the power tong outer ring 21 will be caused to rotate in a right-hand direction, effecting closure of the jaws 30 on the tool joint of pipe P1 and the subsequent rotation of the pipe P1 relative to pipe P2, while the latter would normally be held against rotation by the usual rotary table slips (not shown). However, if the pipe P2 has a tendency to rotate, the operator may actuate backup override valve 433 so as to effect closure of the backup tong assembly B so as to preclude such rotation of the pipe P2. After the joint has initially shouldered and it is desired that the same be made up tight, then the operator will close the manual switch 417 on lever 400, thereby effecting, as described above, the opening of solenoid valve 407 and the closure of solenoid valve 409, also resulting in both the application of control air pressure to the transmission control valve 412 to effect engagement of the low speed clutch means 145 and the application of control air pressure to the valve 415 whereby to allow the application of hydraulic fluid pressure to the backup tong actuator cylinder 265. After the pipe joint has been finally made up tight, as may be indicated by reference to the torque indicator operable by the ram 206 described above, the operator will reverse the lever 400, pulling the same past the mid point, which will result in both the opening of switch 405M whereby the solenoid valve 407 will be allowed to close so that the backup tong B will be caused to open and the shifting of valve 402 to cause driving of the motor 13 in the opposite direction, resulting in rotation of the power tong outer ring 21 in a left-hand direction and opening of the jaws 30 thereof.

Similar operations may be continued so long as pipe joints are being made up. When it is desired to break out pipe joints, the operation would be as follows.

Referring to FIGS. 5, 7, and 8, the operator would shift the selector switch 421 to its alternate position so as to place switch 405B in circuit with lever switch 417. In addition, the operator must move the reverse stop anvil 60 to the other side of the stop lug 58. In order to accomplish this, the operator will open the reverse latch valve 436 to allow the application of actuating air pressure to the reverse stop actuator through conduit 70 so that roller 68 will be projected inwardly to a position at which it is engageable with the V-shaped outer extremity 54 of the reverse latch means so that rotation of the outer ring 21 relative to the inner ring 20 of the power tong T will move the stop anvil 60 past the stop lug 58, such rotation being caused by momentary movement of the control lever 400 in the make up direction, or to the right, as seen in FIG. 19. In addition, in order to condition the tong combination for the breaking out of pipe joints, the backup tong B must be conditioned for closure in response to left-hand rotation of the jaw carrying head 220. This is accomplished by movement of the selector valve 301 to the alternate position, as shown in FIG. 19, so that air will be supplied through conduit 304 to retract the latch pin 289 and through conduit 306 to the actuator cylinder 283, whereby to shift the backup tong actuator cylinder 265 to the left-hand position, or to the opposite position from that seen in FIG. 19.

In order to break out the pipe joint, which requires high torque to effect initial break out, the operator will shift the lever 400 in the break out direction, or to the left, as seen in FIG. 19, while holding the switch 417 closed, resulting in both the opening of normally closed valve 407 whereby to supply control air pressure to clutch valve 412 to effect engagement of the low speed clutch means 145 and the application of control air pressure to the back-up control valve 415 which will allow the application of fluid pressure to the backup actuator cylinder 265 to effect closure of the backup tong. Following the initial break out of the joint, the operator may allow switch 417 to reopen, resulting in the reclosure of normally closed valve 407 and the reopening of normally open valve 409 with the result that the speed control valve 412 will again cause disengagement of the low speed clutch means 145 and engagement of the high speed clutch means 129 while the backup control valve 415 causes reopening of the backup tong, so that the latter is disengaged as the joint is being spun out.

While the specific details of an illustrative embodiment of the invention have been herein shown and described, changes and alterations may be made without departing from the spirit of the invention as defined in the following claims.

We claim:

1. In combination: a power tong assembly and a backup tong assembly adapted to make up and break out pipe joints composed of threaded joint parts, said power tong assembly comprising rotatable pipe gripping means operable upon rotation in either direction to releasably grip and rotate one of said threaded joint parts relative to the other joint part, said backup tong assembly comprising non-rotatable pipe gripping means operable to grip and hold said other joint part against rotation with said one joint part in either direction, means for driving said rotatable pipe gripping means of said power tong assembly including change speed transmission means selectively operable for driving said rotatable pipe gripping means in either direction at high speed and low torque and at low speed and high torque, and control means for effecting engagement of said non-rotatable pipe gripping means with said other joint part in response to operation of said rotatable pipe gripping means at low speed and high torque.

2. The combination of claim 1, wherein said control means includes override means for effecting engagement of said non-rotatable pipe gripping means with said other joint part when said rotatable pipe gripping means is operating at high speed and low torque.

3. The combination of claim 1, wherein said control means includes means for effecting operation of said rotatable pipe gripping means at low speed and high torque while preventing engagement of said non-rotatable pipe gripping means with said other joint part.

4. The combination of claim 1, wherein said control means includes means for effecting engagement of said non-rotatable pipe gripping means with said other joint part upon operation of said rotatable pipe gripping means to grip and rotate said one of said joint parts in one direction and for effecting disengagement of said non-rotatable pipe gripping means from said other joint part upon release of said rotatable pipe gripping means from said one joint part.

5. The combination of claim 1, wherein said control means includes an operating member movable in opposite directions from a neutral position, means for effecting rotation of said rotatable pipe gripping means in one direction upon movement of said member in one direction and for effecting rotation of said rotatable pipe gripping means in the other direction upon movement of said member in said other direction, and means for effecting operation of said change speed transmission means to drive said rotatable pipe gripping means at low speed and high torque upon movement of said member in either of said directions.

6. In combination: a power tong assembly and a backup tong assembly adapted to make up and break out pipe joints composed of threaded joint parts, said power tong assembly comprising an inner ring having a plurality of pipe engaging jaws, an outer ring, means for effecting movement of said jaws into gripping engagement with one of said joint parts upon rotation of said outer ring relative to said inner ring in either direction from a position at which said jaws are retracted, means for driving said outer ring in opposite directions including change speed transmission means operable to drive said outer ring at high speed and low torque and at low speed and high torque, said backup tong comprising a ring including a plurality of jaws engageable with said other joint part, another ring, means for effecting movement of said backup tong jaws into engagement with said other joint part upon angular movement of one of said backup tong rings relative to the other of said rings, and selectively operable control means for effecting said angular movement of said one of said backup tong rings in response to operation of said outer ring of said power tong at low speed and high torque.

7. The combination of claim 6, wherein said control means includes override means for effecting angular movement of said one ring of said backup tong independently of the operation of said power tong.

8. The combination of claim 6, wherein said control means includes means for effecting operation of said outer ring of said power tong at low speed and high torque independently of the operation of said one ring of said backup tong.

9. The combination of claim 6, wherein said control means includes means for effecting angular movement of said one ring of said backup tong upon rotation of said outer ring of said power tong in one direction from said position at which said jaws are retracted and for reversing said angular movement of said one ring of said backup tong when said outer ring of said power tong is moved in the other direction from said position at which said jaws are retracted.

10. In combination: a power tong having pipe gripping and rotating means including normally open jaws movable to pipe gripping directions upon the rotation of said pipe gripping means in either direction from a position at which said jaws are retracted, and a backup tong having non-rotatable pipe gripping means including pipe gripping jaws movable between pipe gripping and retracted positions, and a member movable angularly in opposite directions for effecting movement of said backup tong jaws to pipe gripping positions, fluid motor means for driving said rotatable pipe gripping means in opposite directions, fluid actuator means for effecting said angular movement of said backup tong member, first valve means for controlling the flow of fluid to said motor means to cause reversal of said motor means, second valve means for controlling the flow of fluid to said actuator means, and means for operating said valve means to cause said motor means to rotate in one direction and to cause said actuator means to move said member angularly in one direction and to cause said actuator to move in the other direction upon rotation of said motor means in the other direction.

11. Tong apparatus for making up and breaking out pipe joints composed of relatively rotatable joint parts, comprising: rotatable pipe gripping means including pipe gripping jaws and rotatable driven means operable to effect engagement of said jaws with one of said joint parts upon rotation of said driven means in either direction and opening of said jaws upon rotation in the opposite direction, power means for driving said driven means in either direction, non-rotatable pipe gripping means including pipe gripping jaws, means including an angularly movable member operable to effect engagement of said jaws with the other of said joint parts, actuator means for effecting angular movement of said member, said power means including a reversible fluid motor, said actuator means including a double acting cylinder, means for supplying motor fluid to said motor in opposite directions and pressure fluid to said actuator cylinder in opposite directions, control means for said motor fluid and pressure fluid supplying means, said control means including means for causing the application of pressure fluid to one end of said actuator cylinder to cause closure of said backup tong jaws when said motor fluid is supplied to said motor in one direction and for causing the application of pressure fluid to the other end of said actuator cylinder to cause opening of said backup tong jaws when the supply of motor fluid to said motor is reversed.

12. Tong apparatus as defined in claim 11, wherein said power means includes change speed transmission means for selectively driving said driven means at high speed and low torque and low speed and high torque, and said control means causes said application of pressure fluid to said one end of said actuator cylinder when said transmission means is driving said driven means at low speed and high torque and to the other end of said actuator when said transmission means is driving said driven means at high speed and low torque.

13. Tong apparatus as defined in claim 11, wherein said control means includes override means for causing the application of pressure fluid to said one end of said actuator independently of the direction and speed at which said driven means is rotated.

14. Tong apparatus as defined in claim 11, wherein said control means includes override means causing operation of said transmission to drive said driven means at low speed and high torque independently of said actuator.

15. Tong apparatus as defined in claim 11, wherein said control means includes shiftable motor valve means for controlling the flow of fluid to said motor means in opposite directions, shiftable actuator valve means for reversing the flow of fluid to said actuator, said power means including a change speed transmission for normally driving said driven means at high speed, fluid pressure operated clutch means for effecting operation of said transmission at low speed, shiftable clutch valve means for controlling the flow of fluid to said clutch means, and means for shifting said actuator valve means in one direction in response to shifting of said clutch valve means in one direction.

16. Tong apparatus as defined in claim 11, wherein said control means includes shiftable motor valve means for controlling the flow of fluid to said motor means in opposite directions, shiftable actuator valve means for reversing the flow of fluid to said actuator, said power means including a change speed transmission for normally driving said driven means at high speed, fluid pressure operated clutch means for effecting operation of said transmission at low speed, shiftable clutch valve means for controlling the flow of fluid to said clutch means, and means for shifting said actuator valve means in one direction in response to shifting of said clutch valve means in one direction when said motor valve means is shifted in one direction and for shifting said actuator valve means in the other direction in response to shifting of said clutch valve means in the other direction when said motor valve means is shifted in the other direction.

17. Tong apparatus as defined in claim 11, wherein said power means includes a change speed transmission for driving said driven means, a member shiftable between a normal position to another position to cause said transmission to drive said driven means at low speed, shiftable motor valve means movable from a neutral position to other positions for reversing the flow of fluid to said motor, shiftable actuator valve means movable in opposite directions for reversing the flow of fluid to said actuator, means for causing the movement of said member to said another position and for causing said actuator valve to move in one direction upon movement of said motor valve means from said neutral position to one of said other positions and for causing said actuator valve to move in the other direction upon movement of said motor valve back to its neutral position.

18. A combined power tong and backup tong including a power tong head having rotatable gripping means closable on a joint part upon rotation in either direction and openable upon rotation in the other direction, a backup tong having stationary gripping means closable on another joint part to hold the latter joint part, operating means for said power tong and said backup tong for driving said rotatable gripping means selectively at high and low speeds in opposite directions, and for closing said backup tong jaws when said rotatable gripping means is driven in one direction at low speed and for opening said backup tong jaws when said rotatable gripping means is driven in the other direction.

References Cited

UNITED STATES PATENTS

| 3,261,241 | 7/1966 | Catland | 81—57.18 |
| 3,086,413 | 4/1963 | Mason | 81—57.16 |
| 3,380,323 | 4/1968 | Campbell | 81—57.16 |

FOREIGN PATENTS

| 1,150,630 | 6/1963 | Germany. | |

JAMES L. JONES, Jr., Primary Examiner

U.S. Cl. X.R.

81—57.18